(12) United States Patent
Hou

(10) Patent No.: US 11,218,605 B2
(45) Date of Patent: Jan. 4, 2022

(54) IMAGE FORMING APPARATUS, INFORMATION PROCESSING SYSTEM, AND INFORMATION PROCESSING METHOD

(71) Applicant: SHARP KABUSHIKI KAISHA, Sakai (JP)

(72) Inventor: Jiyuan Hou, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 252 days.

(21) Appl. No.: 16/530,382

(22) Filed: Aug. 2, 2019

(65) Prior Publication Data

US 2021/0234973 A1   Jul. 29, 2021

(30) Foreign Application Priority Data

Aug. 8, 2018 (JP) .............................. JP2018-149198

(51) Int. Cl.
*H04N 1/00* (2006.01)

(52) U.S. Cl.
CPC ..... *H04N 1/00244* (2013.01); *H04N 1/00209* (2013.01); *H04N 1/00411* (2013.01); *H04N 1/00962* (2013.01); *H04N 2201/0094* (2013.01)

(58) Field of Classification Search
CPC .......... G06F 3/12–1298; G06F 2206/15–1514; G06K 15/00–024; G06K 15/18–1823; G06K 15/1827–1834; G06K 15/1856–1865; G06K 15/1882–1888; G06K 15/40–4095; G06K 2215/0002–0037; G06K 2215/0082–0091; G06K 2215/0097; H04N 1/00–00002; H04N 1/00007–00001; H04N 1/00015; H04N 1/00021; H04N 1/00026–0042; H04N 1/005–009; H04N 1/0095–00517; H04N 1/00763–00782; H04N 1/0083–00832; H04N 1/00838–00907;

(Continued)

(56) References Cited

U.S. PATENT DOCUMENTS

2006/0050303 A1* 3/2006 Oomori .............. H04N 1/00217
    358/1.15
2009/0310787 A1* 12/2009 Nishimi .................. H04L 67/34
    380/277

(Continued)

FOREIGN PATENT DOCUMENTS

CN    107097528 A    8/2017
JP    2017-010303 A   1/2017

*Primary Examiner* — Negussie Worku
(74) *Attorney, Agent, or Firm* — ScienBiziP, P.C.

(57) ABSTRACT

An image forming apparatus includes a CPU, and when a user selects to set (activate) an optional function, the image forming apparatus determines whether a connection to a network is possible. If the connection to the network is impossible, information (data for output) for acquiring a license key for activating the optional function from a management server is output by any method of QR code, NFC or displaying URL. The user uses a user terminal to connect to the management server on the basis of the data for output, and acquires license key data from the management server. When the user enters the license key, an optional function selected by the user is activated accordingly.

17 Claims, 16 Drawing Sheets

(58) Field of Classification Search
CPC ..... H04N 1/00912–00997; H04N 1/21; H04N 1/2307–2392; H04N 1/32–32138; H04N 1/32358–36; H04N 1/42–4493; H04N 2201/0008–098; H04N 2201/21–3267; H04N 2201/3273–33371; H04N 2201/33385–33392; H04N 1/00244; H04N 1/00411; H04N 1/00209; H04N 2201/0094; Y02D 10/159
USPC .................................................. 358/100.001
See application file for complete search history.

(56) References Cited

U.S. PATENT DOCUMENTS

| | | | |
|---|---|---|---|
| 2013/0229683 A1 | 9/2013 | Nakayama | |
| 2015/0036176 A1* | 2/2015 | Naruse | H04N 1/00925 358/1.15 |
| 2015/0046976 A1* | 2/2015 | Tonegawa | H04N 1/00228 726/3 |
| 2015/0172267 A1* | 6/2015 | Sato | H04L 63/08 726/3 |
| 2015/0227333 A1* | 8/2015 | Tanaka | G06F 3/126 358/1.15 |
| 2015/0234623 A1* | 8/2015 | Mochizuki | G06F 3/1238 358/1.14 |
| 2016/0173729 A1* | 6/2016 | Kogure | H04N 1/4413 358/1.14 |
| 2016/0381243 A1 | 12/2016 | Manabe et al. | |
| 2017/0228625 A1 | 8/2017 | Nakayama | |
| 2018/0077317 A1* | 3/2018 | Kano | H04N 1/4413 |
| 2018/0101334 A1* | 4/2018 | Suzuki | G06F 3/1238 |
| 2019/0098476 A1* | 3/2019 | Takeishi | G06F 3/1236 |
| 2019/0306365 A1* | 10/2019 | Takenaka | H04N 1/32767 |
| 2019/0349492 A1* | 11/2019 | Takenaka | H04N 1/00477 |
| 2020/0177407 A1* | 6/2020 | Nakamura | G10L 15/22 |
| 2020/0177747 A1* | 6/2020 | Yasuda | H04N 1/00395 |

\* cited by examiner

IMAGE FORMING APPARATUS, INFORMATION PROCESSING SYSTEM, AND INFORMATION PROCESSING METHOD

BACKGROUND OF THE INVENTION

Field of the Invention

The present invention relates to an image forming apparatus, an information processing system, and an information processing method, and more particularly to, for example, an image forming apparatus, an information processing system, and an information processing method that activate a function of the image forming apparatus.

Description of the Background Art

An example of this kind of background art image forming apparatus is disclosed in Japanese Unexamined Patent Application Publication No. 2017-10303. In the technique disclosed in the Japanese Unexamined Patent Application Publication No. 2017-10303, in an environment where an information processing apparatus and one or more image forming apparatuses are connected by a network, in order to activate an optional function of the image forming apparatus, an administrator inputs a license key or the like to the information processing apparatus, and activation of the optional function of the image forming apparatus is performed via the network.

However, in an image forming apparatus such as a multifunction peripheral (MFP), there are many opportunities to obtain a license key and activate an optional function at unpacking, installation and adjustment, but at this point in time, in some cases, the setting for network connection is not completed in the image forming apparatus, and in some cases, even if the setting for network connection is completed in the image forming apparatus, the image forming apparatus may not be able to connect to an external network such as the Internet due to security issues.

In the abovementioned background art, when the image forming apparatus is not connected to a network, a server of a sales company of an image forming apparatus or a mobile of a service person is accessed to obtain the license key, and the obtained license key is used to activate an optional function of the image forming apparatus. In this case, when a mobile e-mail address of a personal computer (PC) of the sales company of an image forming apparatus or the service person is registered or a license key is input in the server in advance, it was required to enter an ID such as an e-mail address, a model and a serial number of the image forming apparatus, and a service cost was high and it took a long time to issue a license key. That is, when the image forming apparatus is not connected to the network, it has been troublesome to activate the optional function.

Therefore, the main object of the present invention is to provide an image forming apparatus, an information processing system and an information processing method that are novel.

In addition, another object of the present invention is to provide an image forming apparatus, an information processing system and an information processing method that are capable of easily activating an optional function even when not connected to a network.

SUMMARY OF THE INVENTION

A first invention is an image forming apparatus including: a setting means that sets an optional function; a determination means that determines whether the image forming apparatus can be connected to an external network when the optional function is set by the setting means; an output means that outputs acquisition information for acquiring activation information for activating the optional function from a server when it is determined by the determination means that a connection is not possible; an input means that inputs the activation information; and an activation means that activates the optional function in response to an input of the activation information by the input means.

A second invention is dependent on the first invention, and further includes a selection means that selects a method for outputting the acquisition information, and the output means outputs the acquisition information by a method selected by the selection means.

A third invention is dependent on the second invention, and the input means inputs the activation information by a same method selected by the selection means.

A fourth invention is dependent on any one of the first to third inventions, and the output means outputs encoded information obtained by encoding the acquisition information.

A fifth invention is dependent on any one of the first to third inventions, and the output means outputs the acquisition information by near field communication.

A sixth invention is dependent on any one of the first to third inventions, and the output means outputs data of a uniform resource locator (URL) corresponding to the acquisition information to a displayer.

A seventh invention is dependent on any one of the first to fifth inventions, the output means outputs acquisition information to a user terminal provided being connectable to a server via a network, and the input means inputs the activation information from the user terminal.

An eighth invention is dependent on any one of the first to seventh inventions, and the acquisition information includes information indicating a connection destination of the server, information for identifying the optional function, and information for specifying the image forming apparatus.

A ninth invention is dependent on any one of the first to eighth inventions, and the activation information is information to activate the optional function only in the image forming apparatus that has output the acquisition information.

A tenth invention is an information processing system including an image forming apparatus and a user terminal provided being connectable to a server via a network, wherein the image forming apparatus includes: a setting means that sets an optional function; a determination means that determines whether the image forming apparatus can be connected to the network when the optional function is set by the setting means; an output means that outputs acquisition information for acquiring activation information for activating the optional function from the server when it is determined by the determination means that a connection is not possible; an input means that inputs the activation information; and an activation means that activates the optional function in response to an input of the activation information by the input means, and the user terminal includes a receiving means that receives the activation information transmitted from the server in accordance with the acquisition information.

An eleventh invention is an information processing method of an information processing system including an image forming apparatus and a user terminal provided being connectable to a server via a network. The information processing method includes: (a) setting an optional function of the image forming apparatus; (b) determining whether the image forming apparatus can be connected to the network when setting the optional function in (a); (c) outputting, from the image forming apparatus, acquisition information for acquiring activation information for activating the optional function from the server when it is determined in (b) that a connection is not possible; (d) receiving, in the user terminal, the activation information transmitted from the server in accordance with the acquisition information; (e) inputting the activation information to the image forming apparatus; and (f) activating the optional function in response to an input of the activation information in (e).

According to the present invention, the optional function can be easily activated even when not connected to the network.

The above object, other objects, features and advantages of the present invention will become more apparent from the detailed description of the following embodiments given with reference to the drawings.

DESCRIPTION OF THE PREFERRED EMBODIMENTS

Hereinafter, embodiments of the present invention will be described in detail with reference to the accompanying drawings.

First Embodiment

Figure 1:
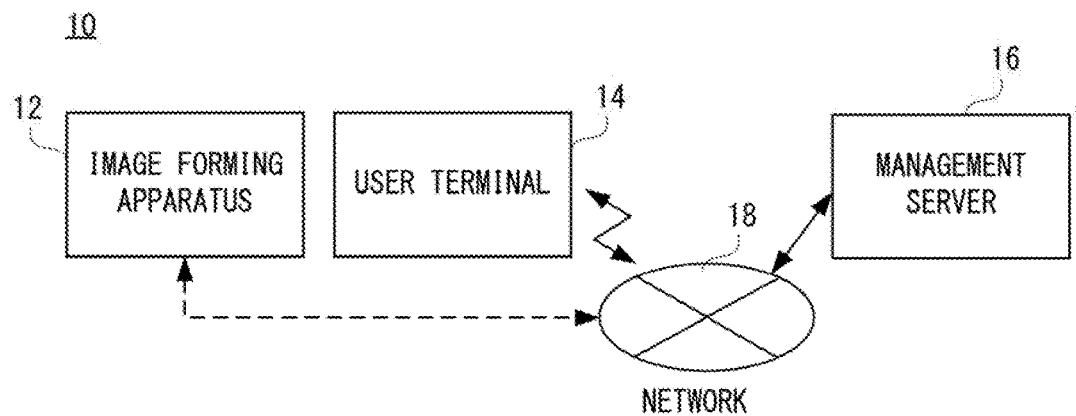
FIG. 1 is a diagram illustrating an example of a configuration of an information processing system according to the present invention.

FIG. 1 is a diagram illustrating an example of a configuration of an information processing system 10 of a first embodiment. As illustrated in FIG. 1, the information processing system 10 includes an image forming apparatus 12, a user terminal 14 and a management server 16. The user terminal 14 is connected to the management server 16 via the Internet or a network 18 composed of a telephone network (a public telephone network or a mobile phone communication network) and the Internet.

While the image forming apparatus 12 includes a communication function, the image forming apparatus 12 is not connected to the network 18 in FIG. 1. However, the image forming apparatus 12 can also be connected to the network 18 if an environment where a connection to the network 18 is possible is established at an installation location. This is illustrated in FIG. 1 by connecting the image forming apparatus 12 and the network 18 with a broken line.

In addition, in this first embodiment, while the network 18 means the Internet or an external network composed of a telephone network and the Internet, there is a case where the image forming apparatus 12 is connected to an external network via an in-house LAN such as an intranet.

In this first embodiment, while the image forming apparatus 12 is a multifunction peripheral (MFP) having a copying function, a printer function, a scanner function, a facsimile function, and the like, the image forming apparatus 12 is also applicable to another image forming apparatus such as a copying machine (copying machine), a printing apparatus (printer) or a facsimile.

The user terminal 14 is, in this first embodiment, a mobile phone (or a feature phone) or a smartphone having an imaging function, a browser function, and a call function. In this first embodiment, the user terminal 14 is connected to the Internet via a mobile phone communication network. However, as long as the user terminal 14 is a terminal that can be connected to the Internet via a mobile phone network and includes an imaging function and a browser function, the user terminal 14 may be another terminal other than the mobile phone and the smartphone.

The management server 16 is a general-purpose server, and although not illustrated, includes various components including a processor, a hard disk drive (HDD), a RAM, and a communicator (a communication module or a communication circuit). The management server 16 is connected to the network 18 in a wired or wireless manner by the communicator.

Figure 2:
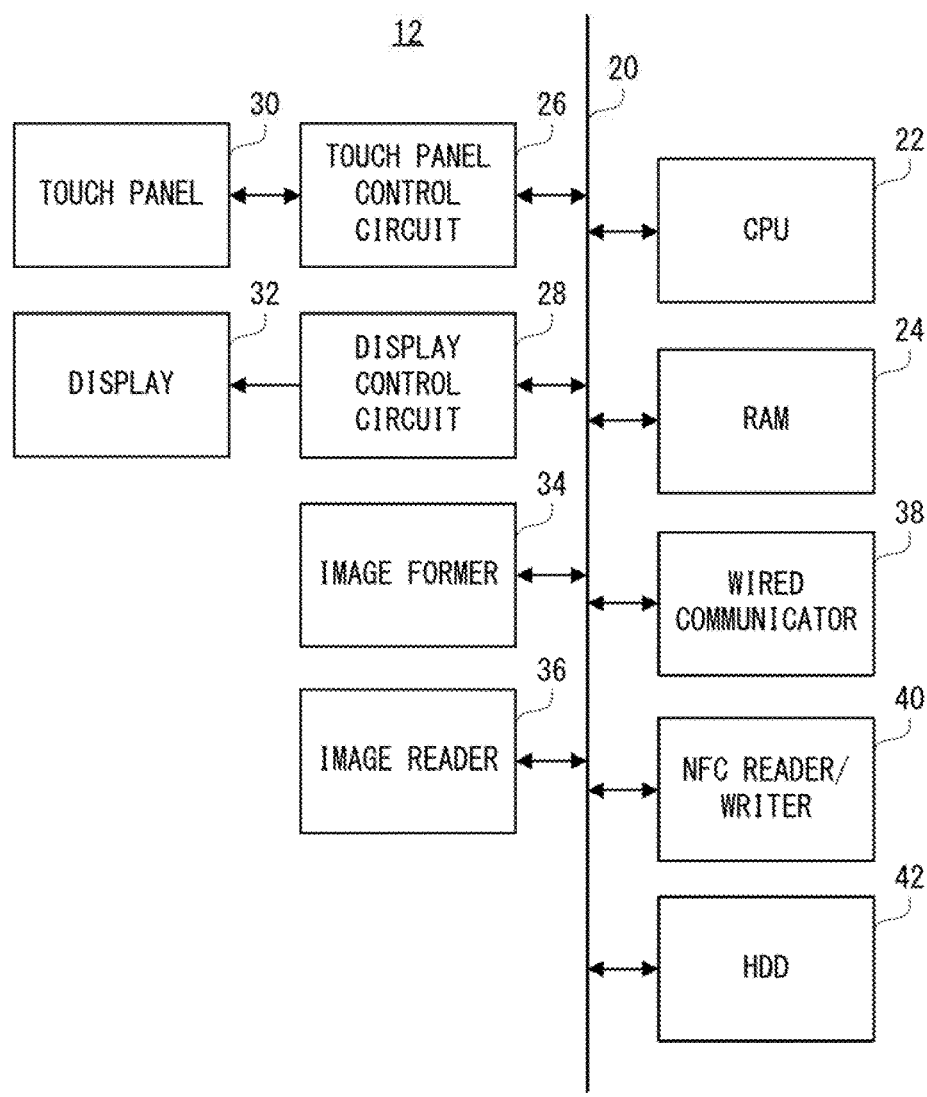
FIG. 2 is a block diagram illustrating an electrical configuration of an image forming apparatus illustrated in FIG. 1.

FIG. 2 is a block diagram illustrating an electrical configuration of the image forming apparatus 12 illustrated in FIG. 1. As illustrated in FIG. 2, the image forming apparatus 12 includes a CPU 22. The CPU 22 is connected to a RAM 24, a touch panel control circuit 26, a display control circuit 28, an image former 34, an image reader 36, and a wired communicator 38, an NFC reader/writer 40 and an HDD 42 via a bus 20. In addition, the image forming apparatus 12 includes a touch panel 30 and a display 32. The touch panel 30 is connected to the touch panel control circuit 26, and the display 32 is connected to the display control circuit 28.

The CPU 22 is responsible for an overall control of the image forming apparatus 12. The RAM 24 is used as a work area and a buffer area of the CPU 22.

The touch panel control circuit 26 applies a required voltage or the like to the touch panel 30, and at the same time detects a touch operation or a touch input within a touch effective range of the touch panel 30, and outputs coordinate data of a touched position to the CPU 22.

The touch panel 30 is provided on a display surface of the display 32. As the touch panel 30, an arbitrary panel such as an electrostatic capacitance type, an electromagnetic induction type, a resistive film type, and an infrared type can be used. In addition, a touch panel display in which the touch panel 30 and the display 32 are integrated may be used.

The display control circuit 28 includes a graphics processing unit (GPU), a video random access memory (VRAM), and the like, and under an instruction of the CPU 22, the GPU uses image generation data 404b stored in the RAM 24 to generate, in the VRAM, display image data for displaying various screens on the display 32, and outputs the generated display image data to the display 32.

The display 32 is a general-purpose display device such as a liquid crystal display (LCD) or an electro-luminescence (EL) display.

The image former 34 includes a photosensitive drum, a charging device, an exposure device, a developing device, a transfer device, a fixing device, and the like, and forms an image on a paper with the use of a dry electrophotographic method. As the image data to be formed on the paper, image data read by the image reader 36 or image data sent from an external information processing apparatus or the like is used. In addition, a recording medium is not limited to a sheet made of a paper.

The image reader 36 includes a light source, a plurality of mirrors, an imaging lens, a line sensor, and the like. The image reader 36 guides reflected light reflected from a surface of a document to the imaging lens by the plurality of mirrors. Then, the reflected light is imaged on a light receiving element of the line sensor by the imaging lens. The line sensor detects a luminance or chromaticity of the reflected light imaged on the light receiving element, and generates read image data based on the image of the surface of the document. In addition, a complementary metal oxide semiconductor (CMOS), a charge coupled device (CCD), or the like is used as the line sensor.

The wired communicator 38 includes a wired communication circuit for connecting to the network 18, and performs communication via the network 18 in accordance with an instruction of the CPU 22. As an example, the wired communicator 38 transmits and receives data on the basis of a wired communication method conforming to a communication standard such as Ethernet (registered trademark).

The NFC reader/writer 40 is comprised of a controller, a storage, and an antenna, and can transmit and receive data by an NFC method. The NFC reader/writer 40 transmits and receives data on the basis of a method conforming to a standard such as International Organization for Standardization/International Electrotechnical Commission (ISO/IEC) 18092 and ISO/IEC 14443. In addition, while the NFC reader/writer 40 is used in this first embodiment, Bluetooth (registered trademark) may be used. The same applies to an NFC reader/writer 64 described later.

The HDD 42 is a main storage device of the image forming apparatus 12, and stores a control program for controlling the image forming apparatus 12, a program for executing various functions including an optional function, data required for executing the control program, image data read by the image forming apparatus 12, data received from other apparatuses, and the like.

In addition, the HDD 42 also stores user authentication information for logging in to the image forming apparatus 12. The user authentication information is a user ID and a password. Moreover, the HDD 42 stores verification information for comparing (or verifying) with information (corresponding to "license key data" described later) for setting (or activating) the optional function. Furthermore, the HDD 42 accesses (or connects to) the management server 16 and stores part of information (corresponding to "data for output 404c" described later) for acquiring license key data from the management server 16.

As described later, the data for output 404c (corresponding to "acquisition information") includes model information (such as a product name) of the image forming apparatus 12, a serial number assigned to the image forming apparatus 12, connection destination information for connecting to (or accessing) the management server 16, a name of an optional function, and identification information for identifying the optional function, and more specifically, is data about a URL including these contents. Among these, the identification information of the optional function is manually input by a user. In addition, while the optional function name and the optional function identification information are information for specifying the optional function, the optional function name may be omitted.

The electrical configuration of the image forming apparatus 12 illustrated in FIG. 2 is merely an example, and the configuration is not required to be limited to this. For example, as an alternative to the wired communicator 38, a wireless communicator may be provided.

Figure 3:
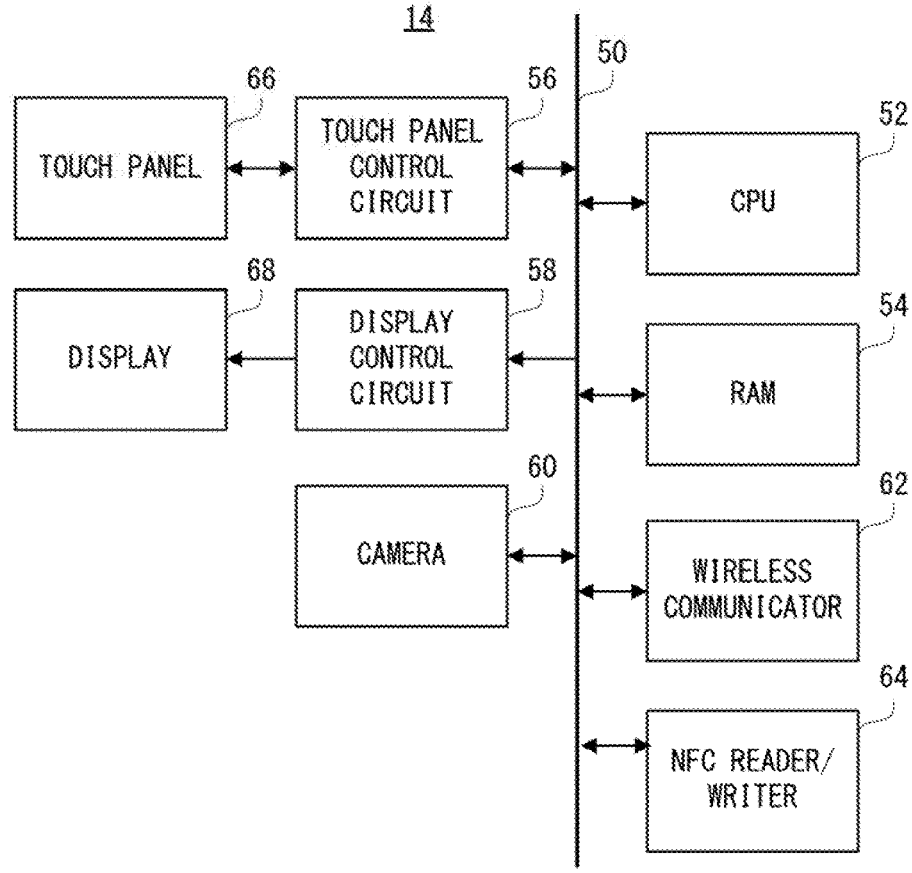
FIG. 3 is a block diagram illustrating an electrical configuration of a user terminal illustrated in FIG. 1.

FIG. 3 is a block diagram illustrating an electrical configuration of the user terminal 14 illustrated in FIG. 1. As illustrated in FIG. 3, the user terminal 14 includes a CPU 52, and the CPU 52 is connected to, via a bus 50, a RAM 54, a touch panel control circuit 56, a display control circuit 58, a camera 60, a wireless communicator 62 and an NFC reader/writer 64. In addition, the user terminal 14 includes a touch panel 66 and a display 68. The touch panel 66 is connected to the touch panel control circuit 56, and the display 68 is connected to the display control circuit 58.

The CPU 52 is responsible for an overall control of the user terminal 14. The RAM 54 is used as a work area and a buffer area of the CPU 52.

The touch panel control circuit 56 applies a required voltage or the like to the touch panel 66, and at the same time detects a touch operation or a touch input within a touch effective range of the touch panel 66, and outputs coordinate data of a touched position to the CPU 52.

The touch panel 66 is provided on a display surface of the display 68. As the touch panel 66, an arbitrary panel such as an electrostatic capacitance type, an electromagnetic induction type, a resistive film type, and an infrared type can be used. In addition, a touch panel display in which the touch panel 66 and the display 68 are integrated may be used.

The display control circuit 58 includes a GPU, a VRAM, and the like. Under an instruction of the CPU 52, the GPU uses display image data 504*b* stored in the RAM 54 to generate, in the VRAM, display image data for displaying various screens on the display 68, and outputs the generated display image data to the display 68.

The display 68 is a general-purpose display device such as an LCD or an electro-luminescence (EL) display.

The camera 60 includes an image sensor such as a charge coupled device (CCD) or a complementary metal oxide semiconductor (CMOS) and a focus lens capable of adjusting a focus position. The light entering through the focusing lens is converted into an electrical signal by the image sensor and then A/D converted to generate image data corresponding to a captured image. The generated image data is input to the CPU 52 and temporarily stored in the RAM 54.

The wireless communicator 62 includes two wireless communication circuits for connecting to the network 18. An antenna is connected to each of the two wireless communication circuits, and in accordance with an instruction from the CPU 52, wireless communication is performed with the use of a telephone function or a wireless communication function by Wi-Fi (registered trademark). One wireless communication circuit of the wireless communicator 62 transmits and receives data on the basis of a communication method conforming to a communication standard such as International Mobile Telecommunications-Advanced (IMT-Advanced) with the use of the telephone function. In addition, the other wireless communication circuit of the wireless communicator 62 transmits and receives data in accordance with a communication standard such as Institute of Electrical and Electronics Engineers (IEEE) 802.11 with the use of the wireless communication function by Wi-Fi (registered trademark).

The NFC reader/writer 64 is comprised of a controller, a storage, and an antenna, and can transmit and receive data by an NFC method, similarly to the NFC reader/writer 40.

In addition, the electrical configuration of the user terminal 14 illustrated in FIG. 3 is merely an example, and the configuration is not required to be limited to this.

The management server 16 is a server that manages a license key (also referred to as a product key) that is information (corresponding to "activation information") for activating an optional function of various image forming apparatuses such as the image forming apparatus 12, and stores the authentication information of the data for output 404*c* and the license key data in an HDD or a RAM. The management server 16 determines whether the data for output 404*c* received from the user terminal 14 matches the authentication information of the data for output 404*c*. If they match, the management server 16 returns, to a transmission source of the data for output 404*c*, the license key data for the optional function indicated by the data for output 404*c*.

In the information processing system 10 having such a configuration, when activating an optional function of the image forming apparatus 12, it is required to acquire a license key for the optional function from the management server 16 and input same to the image forming apparatus 12.

Hereinafter, a method for activating the optional function will be described with reference to various screens displayed on the display 32 of the image forming apparatus 12 and the display 68 of the user terminal 14. Since not the constitutive content of this invention, other than activating the optional function will be briefly described or omitted.

Figure 4:
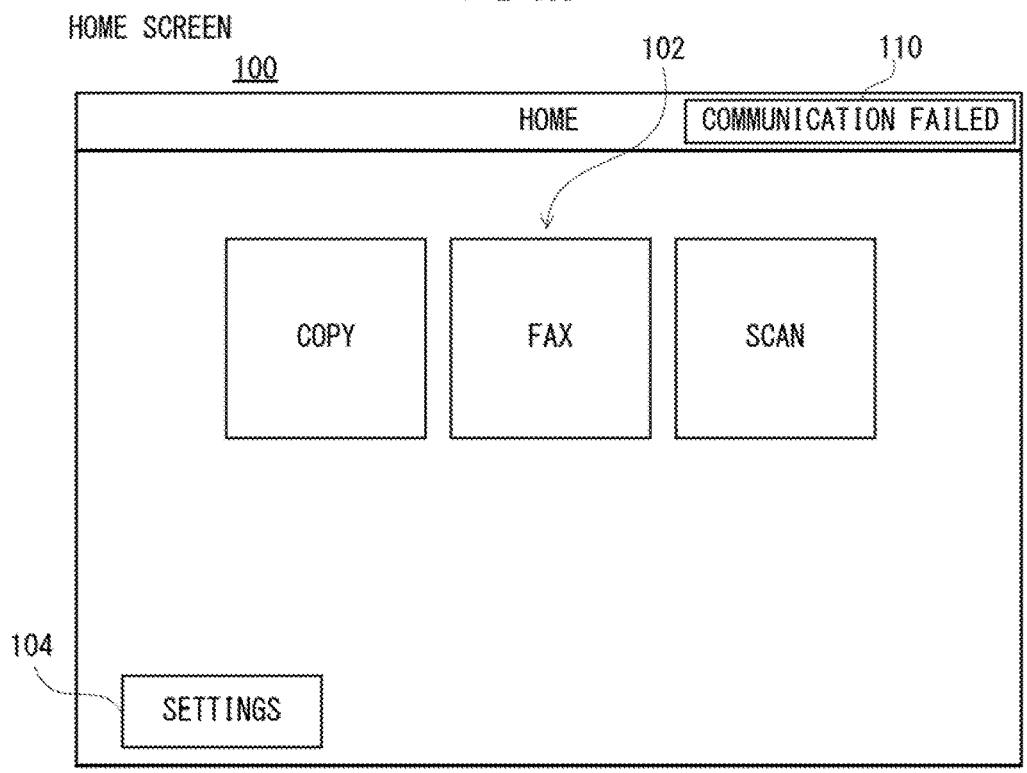
FIG. 4 is a diagram illustrating an example of a home screen displayed on a display of the image forming apparatus.

FIG. 4 is a diagram illustrating an example of a home screen 100 displayed on the display 32 of the image forming apparatus 12. The image forming apparatus 12 executes user authentication when a main power is turned on or shifts from a power saving mode to a normal mode. When the user authentication succeeds, the image forming apparatus 12 displays the home screen 100 such as that illustrated in FIG. 4 on the display 32.

Although illustration is omitted, when performing the user authentication, the image forming apparatus 12 displays a screen for inputting a user ID and a password on the display 32, and in response to an input of the user ID and the password, determines whether the input matches the user authentication information (i.e., a combination of a user ID and a password) stored in the HDD 42. If the input user ID and password match the user authentication information stored in the HDD 42, it is determined that the user authentication has succeeded. Meanwhile, if at least one of the input user ID and password does not match the user authentication information stored in the HDD 42, it is determined that the user authentication has failed. However, instead of inputting the user ID and password, the NFC reader/writer 40 may be used to read the user ID and password from an ID card.

The home screen 100 is a screen for displaying a main menu of the image forming apparatus 12, and the home screen 100 is provided with a plurality of icons 102. The plurality of icons 102 are provided to select a copy function, a fax function, or a scan function. In addition, the home screen 100 is provided with an icon (or a setting button) 104. The icon 104 is provided to perform various settings.

Moreover, in the home screen 100, an index image 110 is displayed. The index image 110 is an image for identifiably indicating whether the image forming apparatus 12 is connected to the network 18. The index image 110 illustrated in FIG. 4 is an image displayed when the image forming apparatus 12 is not connected to the network 18, and characters "communication failed" are described in a quadrangle frame. Although illustration is omitted, when communication is possible, the index image 110 in which characters "communication possible" are described in the quadrangle frame is displayed. However, the index image 110 is an example, and a drawing pattern may indicate that a communication has failed or a communication is possible. Since these things are the same also about the index images 130, 150, 170, 190, 210, 230, 250, 270, and 310 displayed on another screen described later, redundant description will be omitted.

However, as described above, the image forming apparatus 12 may be connected to the intranet. In this case, even if the image forming apparatus 12 is connected to the intranet, when being not connected to the network 18, the license key cannot be acquired from the management server 16. Therefore, the index image 110 may include a first image for identifying whether a connection to the intranet is established (an image indicating that communication is possible or communication failed) and a second image for identifying whether a connection to the network 18 is established (an image indicating that communication is possible or communication failed).

In the home screen 100, when the icon 102 is touched, a screen for executing a function assigned to the touched icon 102 is displayed on the display 32. That is, a copy operation screen, a fax operation screen, or a scan operation screen is displayed on the display 32. Executing these functions in accordance with each operation screen is already known, and since this is not the constitutive content of the present invention, the description of each function of copy, fax, and scan will be omitted.

Figure 5:
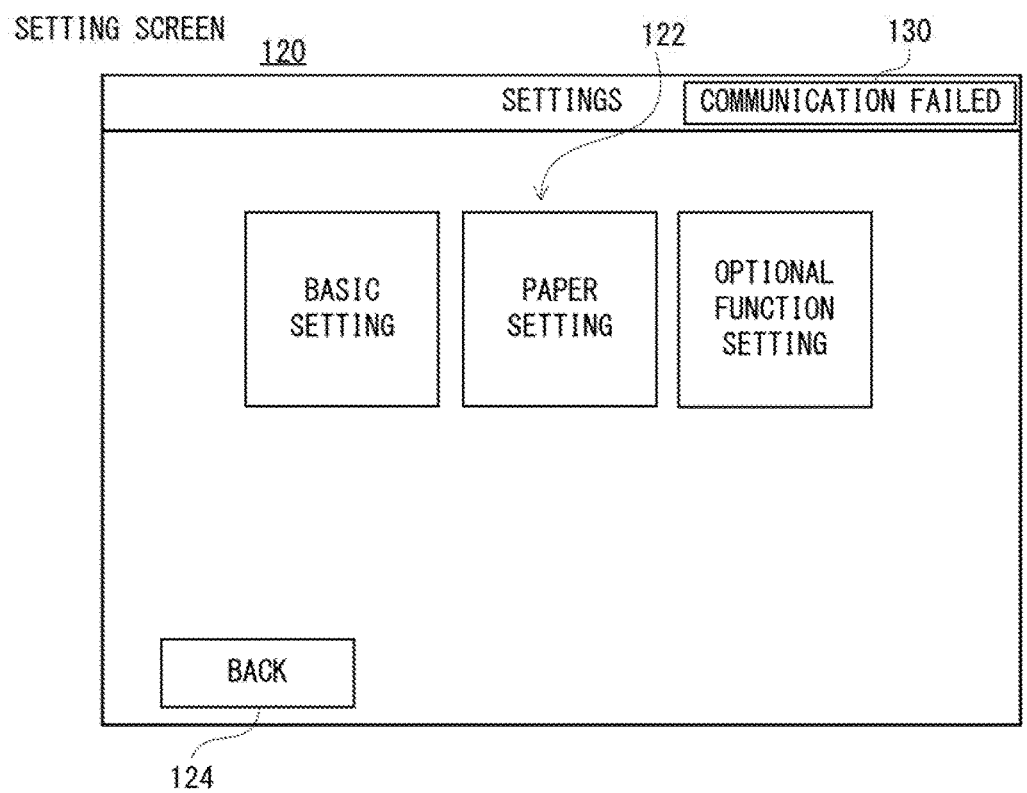
FIG. 5 is a diagram illustrating an example of a setting screen displayed on the display of the image forming apparatus.

In addition, when the icon 104 is touched in the home screen 100, a setting screen 120 such as that illustrated in FIG. 5 is displayed on the display 32. The setting screen 120 is a screen for confirming or changing various settings, and the setting screen 120 is provided with a plurality of icons 122. The plurality of icons 122 are provided to perform a basic setting, a paper setting and an optional function setting. In the setting screen 120, when the icon 122 is touched, a screen for executing a function assigned to the touched icon 122 is displayed on the display 32. That is, a basic setting screen, a paper setting screen, or an optional function setting screen is displayed on the display 32. In the basic setting screen, an illuminance of the display 32 provided in the image forming apparatus 12, conditions for shifting to a power saving mode, and the like are confirmed and set. In the paper setting screen, a paper size set in a paper tray or a paper cassette is confirmed and set. In the optional function setting screen, a process for confirming and activating an optional function is started. In addition, an icon 124 is provided to display a previous screen (here, the home screen 100) on the display 32. In other words, the icon 124 returns the screen to the previous screen. The same applies to icons 148, 168, 184, 202, 226, 264, and 308 described later. Furthermore, in the setting screen 120, an index image 130 is displayed.

Figure 6:
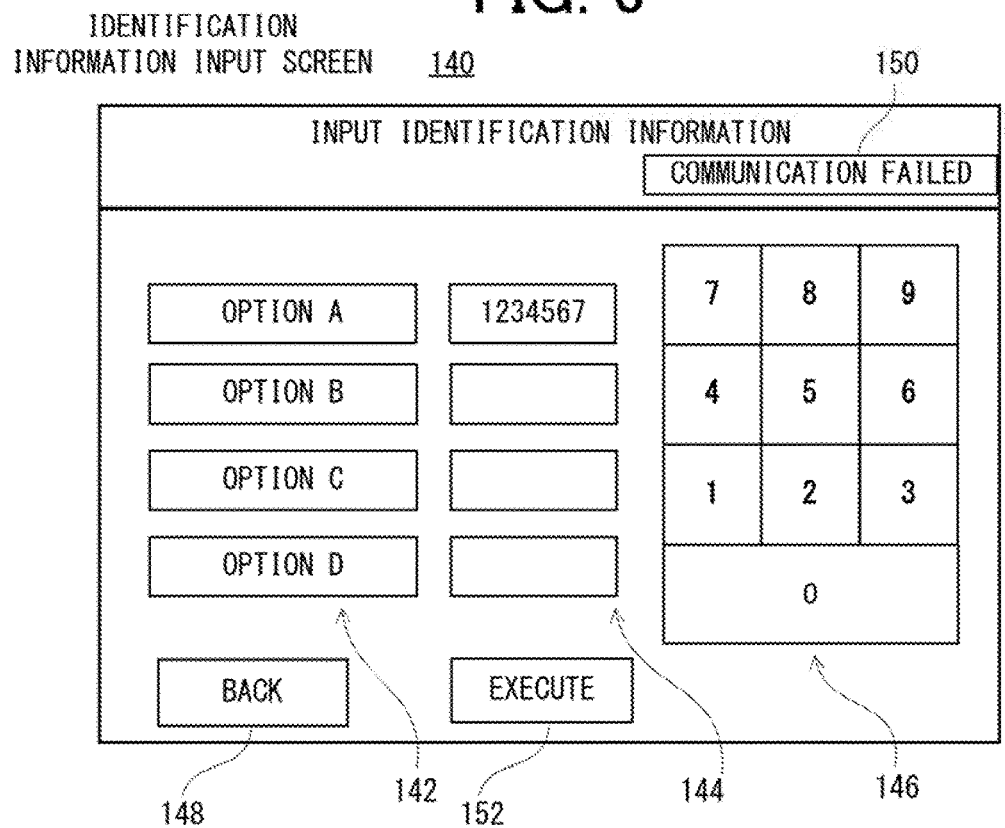
FIG. 6 is a diagram illustrating an example of an identification information input screen displayed on the display of the image forming apparatus.

When the icon 122 for setting an optional function is touched in the setting screen 120, an identification information input screen 140 such as that illustrated in FIG. 6 is displayed on the display 32.

The identification information input screen 140 is a screen for inputting identification information of an optional function, and the identification information input screen 140 is provided with a plurality of display areas 142, a plurality of input areas 144, numeric keys 146, an icon 148, and an icon 152. In addition, in the identification information input screen 140, an index image 150 is displayed.

Each of the plurality of display areas 142 is provided to display a name of an optional function. In the example illustrated in FIG. 6, an option A, an option B, an option C and an option D are displayed in each display area 142. Since an optional function per se is not the constitutive content of the present invention, the specific content will be omitted, but as an example, a function such as a font kit for barcode and an Internet fax extension kit is applicable. The barcode font kit is an application for using barcode fonts. The Internet fax extension kit is an application for enabling transmission and reception of fax data as an e-mail attachment via a local area network (LAN) and/or the Internet without via a public telephone line.

The plurality of input areas 144 are provided corresponding to the plurality of display areas 142, and are areas for inputting identification information, and display the input identification information. The numeric keys 146 are software keys for manually inputting the identification information, and each numeral from 0 to 9 can be inputted. The icon 148 is provided to return to a previous screen (here, the setting screen 120). In addition, the icon 152 is provided to indicate that the input of identification information has been completed and to execute (or instruct) acquisition of a license key of an optional function to be activated.

The user operates (or touches) the numeric keys 146 to input identification information of an optional function to be activated in the input area 144 corresponding to the display area 142 in which the optional function is displayed. In this first embodiment, the identification information of the optional function is attached to a predetermined kit such as the font kit for barcode and the Internet fax extension kit described above. In this first embodiment, the identification information of the optional function is represented by a seven-digit number. However, this is an example, and the identification information may be represented by alphabet or numbers and alphabet. When the alphabet is included, a software key for inputting the alphabet is also provided in the identification information input screen 140 in addition to the numeric keys 146.

While, in this first embodiment, the identification information of the optional function is attached to the predetermined kit, when the activated optional function is incorporated in advance in the image forming apparatus 12 and the identification information of the optional function is also stored in advance in the image forming apparatus 12, the identification information of the optional function may be made available from a list in which a name of the optional function or/and a description of the optional function are displayed.

After touching and specifying the input area 144 corresponding to the display area 142 in which the optional function to be activated is displayed, when the user inputs the identification information of the optional function and touches the icon 152, the image forming apparatus 12 executes an authentication process regarding whether the input identification information is correct. Here, it is determined whether the input identification information matches the identification information stored in advance in the HDD 42. Although detailed description is omitted, identification information corresponding to each optional function is stored in an area inaccessible by an operation of a user of the HDD 42, and is referred to in a case of authenticating the identification information. The same applies to a license key authentication process described later.

If the input identification information does not match the identification information stored in advance in the HDD 42, it is informed that the identification information is an error, and in order to input the identification information again, the identification information input screen 140 in which nothing is input is displayed on the display 32. However, when it is informed that the identification information is an error, a message denoting the error is displayed on the display 32 as text, a message denoting the error is outputted from a speaker as voice or sound, or both are performed. Hereinafter, the same applies to the case of informing.

Meanwhile, when the input identification information matches the identification information stored in advance in the HDD 42, it is determined that the identification information is correct, and the image forming apparatus 12 determines whether the network 18 is connected.

When connected to the network 18, the image forming apparatus 12 transmits the data for output 404*c* to the management server 16 via the network 18, and receives the license key transmitted from the management server 16 accordingly. In this case, the image forming apparatus 12 executes an authentication process with the use of the received license key to automatically activate an optional function. In the authentication process, it is determined whether the received license key matches the license key stored in advance in the HDD 42. If they match, the authentication is successful. If they do not match, the authentication is failed. If the authentication is successful, an optional function corresponding to the license key is activated. Meanwhile, if the authentication is failed, after an authentication error is informed, the data for output 404c is transmitted to the management server 16 again, and the license key is received again.

Meanwhile, when the image forming apparatus 12 is not connected to the network 18, that is, when the image forming apparatus 12 is unable to communicate, the user accesses the management server 16 with the use of the user terminal 14 and acquires a license key of an optional function to be activated and inputs the acquired license key to the image forming apparatus 12.

In this first embodiment, since the image forming apparatus 12 includes a communication function, when a communication has failed, it means that an environment or facility for connecting the image forming apparatus 12 to the network 18 is not ready at a place where the image forming apparatus 12 is installed. However, a case where although the environment or facility for connecting to the network 18 is ready and the setting of the network connection of the image forming apparatus 12 is completed, a connection to the network 18 is not established due to security issues is also included in the case of failed communication.

Figure 7:
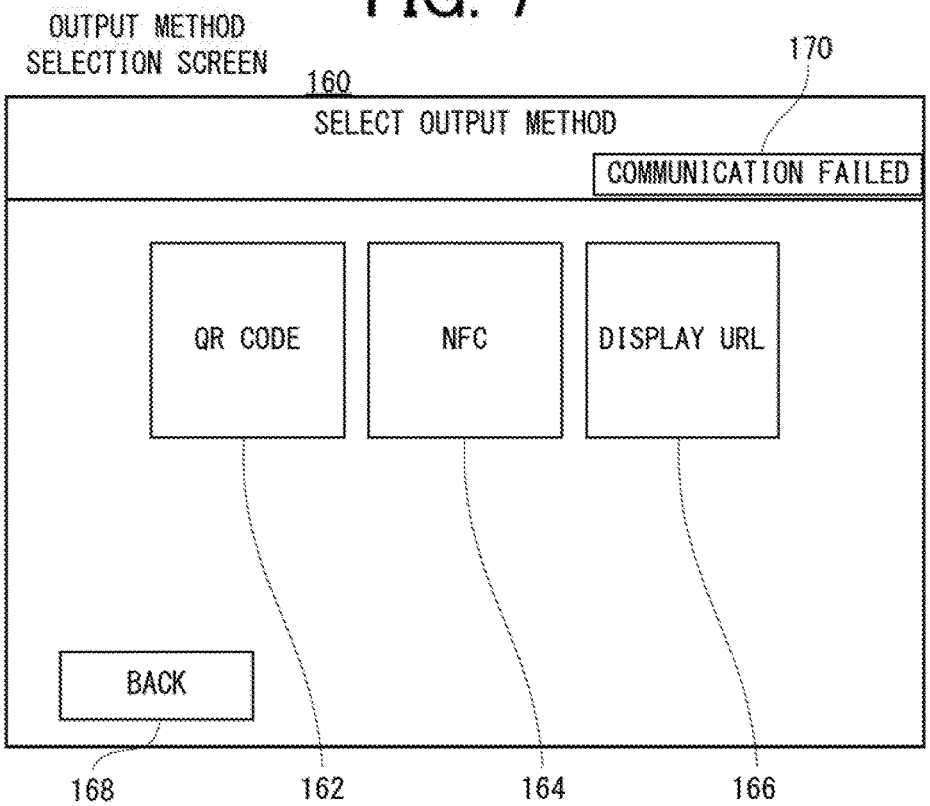
FIG. 7 is a diagram illustrating an example of an output method selection screen displayed on the display of the image forming apparatus.

As described above, when the image forming apparatus 12 is unable to communicate, the output method selection screen 160 such as that illustrated in FIG. 7 is displayed on the display 32 in response to a touch on the icon 152 in the identification information input screen 140. The output method selection screen 160 is a screen for selecting a method for outputting the data for output 404c (or a URL corresponding to this).

As illustrated in FIG. 7, the output method selection screen 160 is provided with an icon 162, an icon 164, an icon 166, and an icon 168. In addition, in the output method selection screen 160, an index image 170 is displayed.

Figure 8:
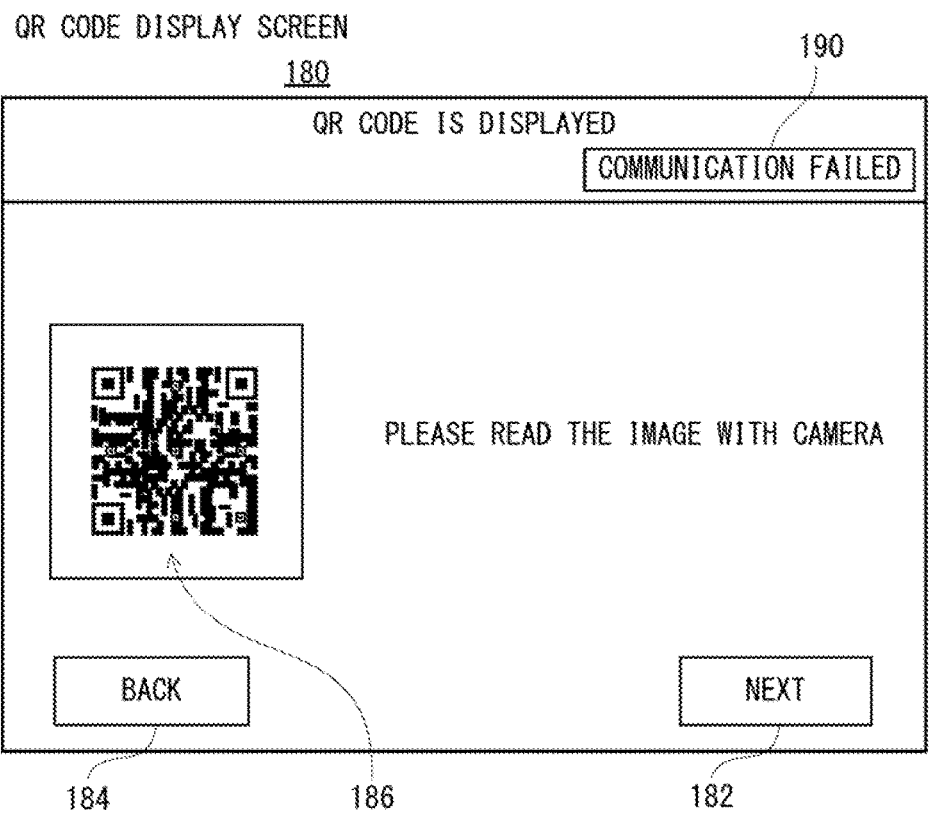
FIG. 8 is a diagram illustrating an example of a quick response (QR) code display screen displayed on the display of the image forming apparatus.
Figure 9:
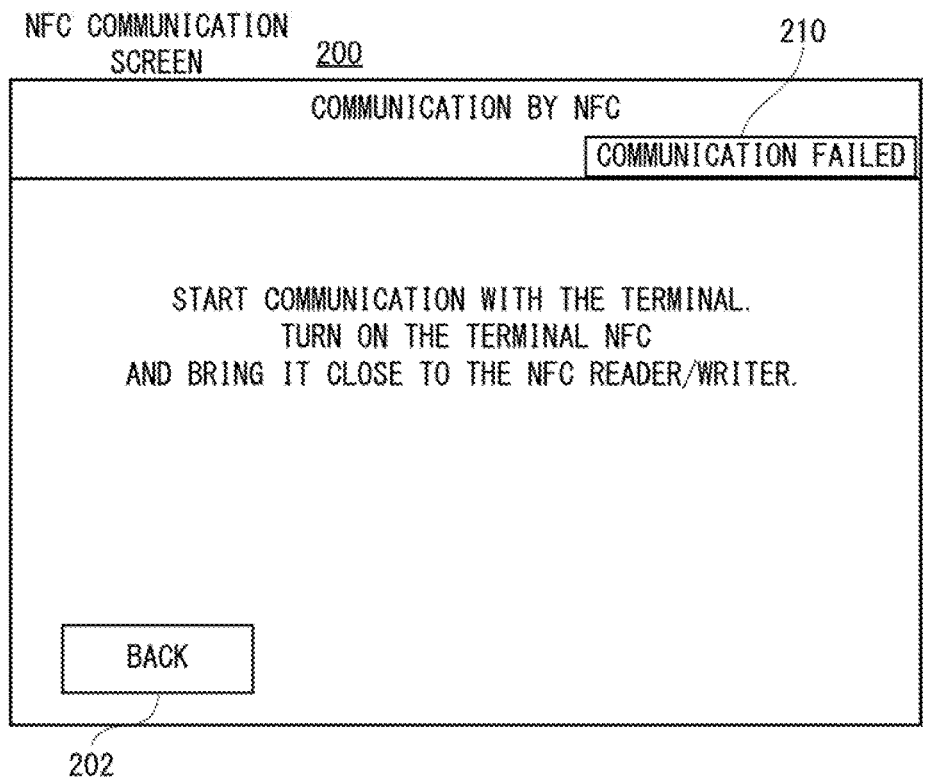
FIG. 9 is a diagram illustrating an example of a near field communication (NFC) communication screen displayed on the display of the image forming apparatus.
Figure 10:
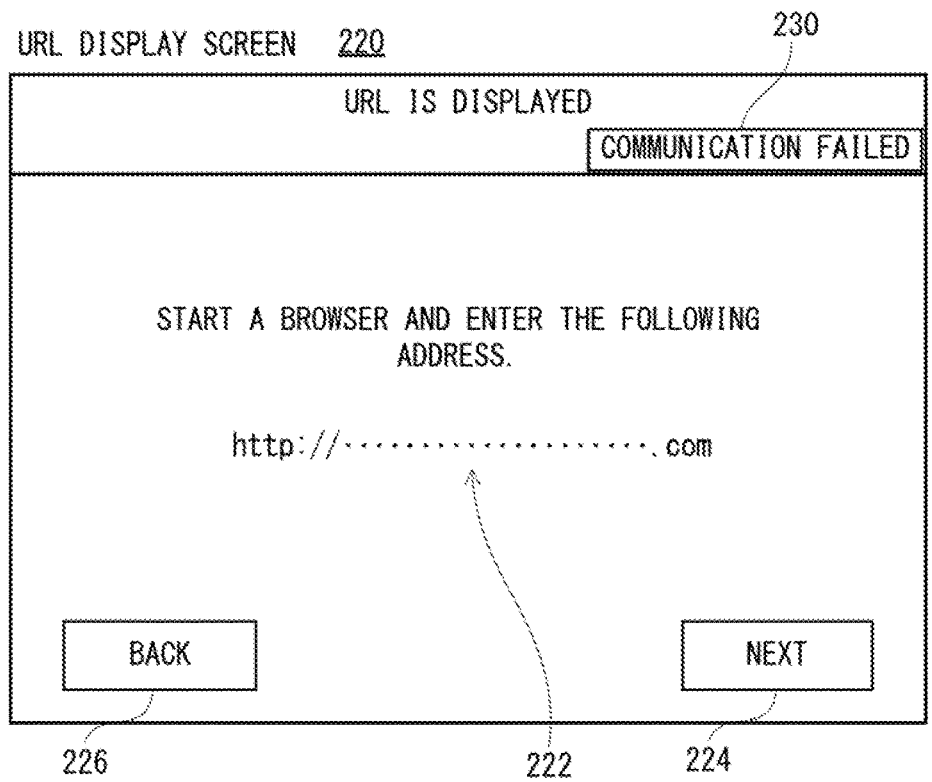
FIG. 10 is a diagram illustrating an example of a URL code display screen displayed on the display of the image forming apparatus.

The icon 162, the icon 164 and the icon 166 are provided to select a method for acquiring the data for output 404c, and when touched, a screen for executing an acquisition method assigned to the touched icon 162, icon 164 or icon 166 is displayed on the display 32. When the icon 162 is touched, a method for outputting the data for output 404c by reading a QR code (registered trademark) (hereinafter, may be referred to as a "first method" in this specification) is selected, a QR code display screen 180 such as that illustrated in FIG. 8 is displayed on the display 32. When the icon 164 is touched, a method for outputting the data for output 404c by communication using an NFC (hereinafter, may be referred to as a "second method" in this specification) is selected, an NFC communication screen 200 such as that illustrated in FIG. 9 is displayed on the display 32. When the icon 166 is touched, a method for outputting a URL corresponding to the data for output 404c by displaying a URL (hereinafter, may be referred to as a "third method" in this specification) is selected, a URL display screen 220 such as that illustrated in FIG. 10 is displayed on the display 32. The icon 168 is provided to return to a previous screen (here, the identification information input screen 140).

Although omitted in FIG. 7, in the output method selection screen 160, a message for notifying that "the communication through the network 18 is impossible" and "the license key is acquired by a method not using the communication through the network 18" may be displayed. For example, a message such as "Network communication with the outside cannot be performed. Please select a method other than network communication and acquire a license key." is displayed between the icons 162 to 166 and the icon 168.

The QR code display screen 180 illustrated in FIG. 8 is a screen for causing the user terminal 14 to acquire the data for output 404c with the use of a QR code 186. This QR code display screen 180 is provided with an icon 182 and an icon 184. In addition, in the QR code display screen 180, a message prompting reading of the QR code 186 is displayed, and at the same time, the QR code 186 and an index image 190 generated by performing a predetermined encoding process on the data for output 404c are displayed.

The icon 182 is provided to display a next screen (here, a license key input screen 240 illustrated in FIG. 11) on the display 32. The icon 184 is provided to return to a previous screen (here, the output method selection screen 160). The same applies to an icon 202 of the NFC communication screen 200 and an icon 226 of the URL display screen 220, which will be described later.

When the QR code display screen 180 is displayed, that is, when the first method is selected, the user reads the QR code 186 with the use of a camera function of the user terminal 14. Then, the user terminal 14 starts a browser, accesses the management server 16 in accordance with a URL corresponding to the data for output 404c obtained by decoding the read QR code 186, and at the same time requests the management server 16 to acquire a license key. In doing so, the user terminal 14 communicably connects to the management server 16 via a mobile phone network and the Internet.

While the QR code 186 is used in the first embodiment, another code such as DataMatrix or a bar code may be used.

In addition, as described above, in this first embodiment, while the data for output 404c is data about a URL including model information of the image forming apparatus 12, a serial number assigned to the image forming apparatus 12, connection destination information for connecting to the management server 16, a name of an optional function, and identification information of the optional function, the data for output 404c may be data about a URL indicating only connection destination information for connecting to the management server 16 and additional information including model information (such as a product name) of the image forming apparatus 12, a serial number assigned to the image forming apparatus 12, a name of an optional function, and identification information of the optional function. In such a case, the user terminal 14 accesses the management server 16 to separately specify the additional information. The same applies to when the second method or the third method is selected. However, in the case of the third method, it is required to input each of the URL and the additional information to the user terminal 14.

In addition, the NFC communication screen 200 illustrated in FIG. 9 is a screen displayed on the display 32 when performing near field communication with the use of the NFC reader/writer 40. At a center of the NFC communication screen 200, a message for prompting preparation and execution of near field communication is displayed. Moreover, an icon 202 is provided in the NFC communication screen 200. Furthermore, in the NFC communication screen 200, an index image 210 is displayed.

The image forming apparatus 12 activates the NFC reader/writer 40 in parallel with a process for displaying the NFC communication screen 200 on the display 32, and starts or executes a process for transmitting the data for output 404c.

When the NFC communication screen 200 is displayed, that is, when the second method is selected, the user activates the NFC reader/writer 64 of the user terminal 14 and brings the user terminal 14 close to the NFC reader/writer 40, and causes the user terminal 14 to acquire (or receive) the data for output 404c. Then, the user terminal 14 starts a browser, accesses the management server 16 in accordance with a URL corresponding to the acquired data for output 404c, and at the same time requests the management server 16 to acquire a license key. In doing so, the user terminal 14 communicably connects to the management server 16 via a mobile phone network and the Internet.

In this first embodiment, when completing transmission of the data for output 404c to the user terminal 14, that is, when completing near field communication, the image forming apparatus 12 automatically causes the display 32 to display a next screen (here, the license key input screen 240). However, the next screen may be displayed on the display 32 by an operation of the user.

In addition, the URL display screen 220 illustrated in FIG. 10 is a screen for displaying a URL 222 corresponding to the data for output 404c. At a center of the URL display screen 220, a message prompting the start of a browser of the user terminal 14 and an input of an address, that is, the URL 222 corresponding to the data for output 404c and the URL 222 are displayed. In addition, the URL display screen 220 is provided with an icon 224 and an icon 226. Furthermore, in the URL display screen 220, an index image 230 is displayed.

The icon 224 is provided to display a next screen (here, the license key input screen 240) on the display 32.

When the URL display screen 220 is displayed, that is, when the third method is selected, the user starts the browser of the user terminal 14 and inputs the URL 222 in an URL input field and enters (executes) same. Then, the user terminal 14 accesses the management server 16 in accordance with the URL 222, and at the same time requests the management server 16 to acquire a license key. In doing so, the user terminal 14 communicably connects to the management server 16 via a mobile phone network and the Internet.

The management server 16 acquires, in response to the license key acquisition request, the license key corresponding to a model of the image forming apparatus 12 indicated by the model information and an optional function indicated by the identification information, from the HDD or a database, and transmits the license key to the user terminal 14 which has accessed. Upon receipt of the license key, the user terminal 14 outputs the license key in a manner according to an instruction by the user. When the user selects the display of a QR code, the user terminal 14 displays, on the display 68, the QR code obtained by encoding the license key. When the user selects the transmission by NFC, the user terminal 14 activates the NFC reader/writer 64 and transmits the received data of the license key via the NFC reader/writer 64. When the user selects a display on a screen, the user terminal 14 displays, on the display 68, the license key in a text.

In this first embodiment, while the home screen 100 is displayed when the user authentication is successful, there is no need to perform user authentication in order to allow the user to input an identification number of the optional function as long as the identification number is managed to be input by only a user having a proper authority. In addition, user authentication may be performed only when the identification number of the optional function is not input by a user. For example, the display area 142 of the optional function may be an icon for inputting the identification number of the corresponding optional function, and the identification number may be input to the corresponding input area 144 in response to a touch on the icon.

Figure 11:
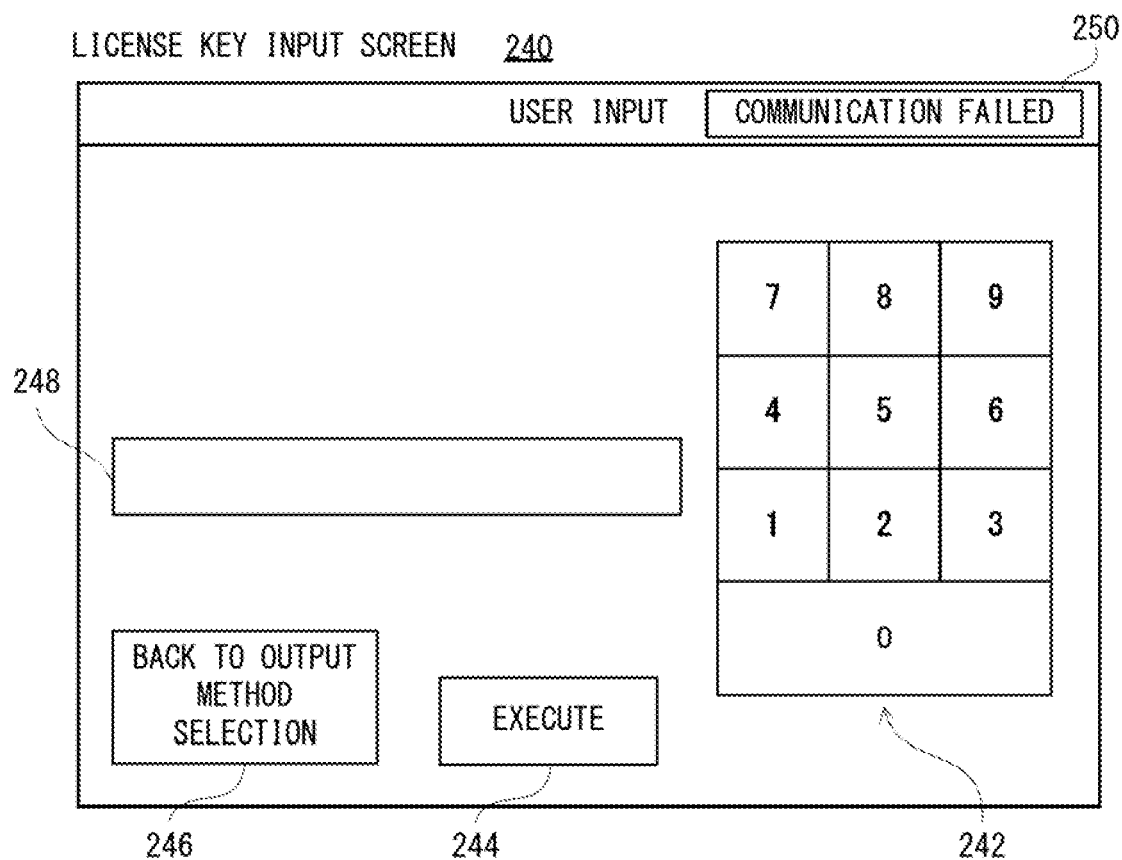
FIG. 11 is a diagram illustrating an example of a license key input screen displayed on the display of the image forming apparatus.

As described above, the data for output 404c or the URL corresponding to this is acquired by the first method, the second method or the third method, and the license key input screen 240 illustrated in FIG. 11 is displayed on the display 32 automatically or by a user operation.

The license key input screen 240 is a screen for inputting a license key of an optional function to be activated. As illustrated in FIG. 11, the license key input screen 240 is provided with numeric keys 242, an icon 244, an icon 246 and an input area 248. In addition, in the license key input screen 240, an index image 250 is displayed.

The numeric keys 242 are software keys for manually inputting a license key, and each numeral from 0 to 9 can be inputted. The icon 244 is provided to authenticate an input license key and to execute activation of a corresponding optional function. When the icon 244 is touched, an authentication process of the input license key is performed. Here, it is determined whether the input license key matches a license key (hereinafter referred to as "verification information") stored in advance in the HDD 42, and if they match, a corresponding optional function is activated. That is, the activated optional function is enabled. Although illustration is omitted, when they do not match, the corresponding optional function is not activated, and re-input of the license key is performed.

While in this first embodiment, a license key is stored as the verification information, and it is determined whether a license key matches the verification information, the present invention is not required to be limited to this. By performing a predetermined computation process with the use of the license key and predetermined information, it may be determined whether the computation result is correct.

In addition, the icon 246 is provided to return to the output method selection screen 160. The input area 248 is an area for inputting numbers, that is, a license key with the use of the numeric keys 242, and sequentially displays the input numbers. In this first embodiment, while the license key is represented by a numeric string, the license key may be represented by alphabet or numbers and alphabet. When the alphabet is included, a software key for inputting the alphabet is also provided in the license key input screen 240 in addition to the numeric keys 242.

Figure 12:
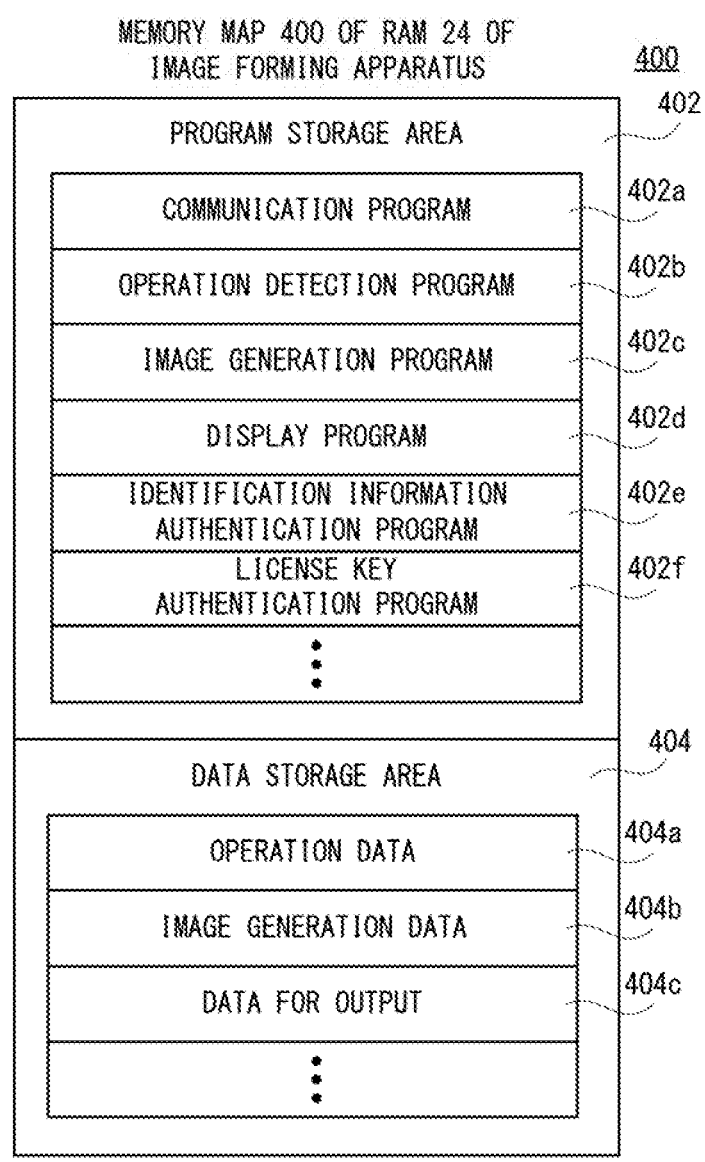
FIG. 12 is a diagram illustrating an example of a memory map of a random access memory (RAM) of the image forming apparatus illustrated in FIG. 1.

FIG. 12 is a diagram illustrating an example of a memory map of the RAM 24 of the image forming apparatus 12 illustrated in FIG. 2. As illustrated in FIG. 12, the RAM 24 includes a program storage area 402 and a data storage area 404. In addition, the program storage area 402 of the RAM 24 stores a control program of the image forming apparatus 12, that is, an information processing program. The information processing program includes a communication program 402a, an operation detection program 402b, an image generation program 402c, a display program 402d, an identification information authentication program 402e, and a license key authentication program 402f.

The communication program 402a is a program for determining a connection status with the network 18, and if communication is possible, controlling the wired communicator 38 and transmitting and receiving data. In addition, the communication program 402a is also a program for establishing and setting a communication path for an NFC-compliant device such as the user terminal 14 or an NFC-compliant card with the use of the NFC reader/writer 40 and transmitting and receiving data.

The operation detection program 402b is a program for detecting operation detection data corresponding to an operation on each operator of the image forming apparatus 12. Specifically, when the touch panel 30 is touched (or operated), the CPU 22 acquires touch coordinate data output from the touch panel 30 as operation data 404a in accordance with the operation detection program 402b and stores same in a buffer. In addition, when a hardware button or key is pressed or operated, the CPU 22 acquires, in accordance with the operation detection program 402b, the operation data 404a by pressing or operating the button or key, and stores same in the buffer.

The image generation program 402c is a program for generating display image data for displaying various display images on the display 32 (in this embodiment, the screens 100, 120, 140, 160, 180, 200, 220, and 240, etc. described above) with the use of the image generation data 404b described later. The display program 402d is a program for displaying on the display 32 a display image corresponding to the display image data generated in accordance with the image generation program 402c.

The identification information authentication program 402e is a program for determining whether the identification information input by the user in the identification information input screen 140 matches the identification information stored in advance in the HDD 42, and if they match, selecting a method for acquiring the data for output 404c, and if they do not match, informing an error of the identification information.

The license key authentication program 402f is a program for determining whether the license key received from the management server 16 or the license key input by the user in the license key input screen 240 matches the verification information (license key) stored in advance in the HDD 42, and if they match, activating an optional function corresponding to the license key, and if they do not match, informing an error of the license key.

Although illustration is omitted, the program storage area 402 also stores other programs required for copying, faxing, and scanning.

The data storage area 404 stores the operation data 404a, the image generation data 404b and the data for output 404c.

The operation data 404a is operation data detected in accordance with the operation detection program 402b, and stored according to time series. The operation data 404a is deleted after being used for the process of the CPU 22.

The image generation data 404b is data including polygon data, texture data, and the like for generating display image data corresponding to a display image to be displayed on the display 32.

The data for output 404c is data including identification information for identifying model information of the image forming apparatus 12, a serial number assigned to the image forming apparatus 12, connection destination information for connecting to (or accessing) the management server 16, and an optional function to be activated. Data excluding the identification information for identifying the optional function in the data for output 404c is read from the HDD 42 and stored in the RAM 24.

Although illustration is omitted, in the data storage area 404, other data required for executing an information processing program is stored, and a flag and a counter (timer) required for executing the information processing program are also provided.

Figure 13:
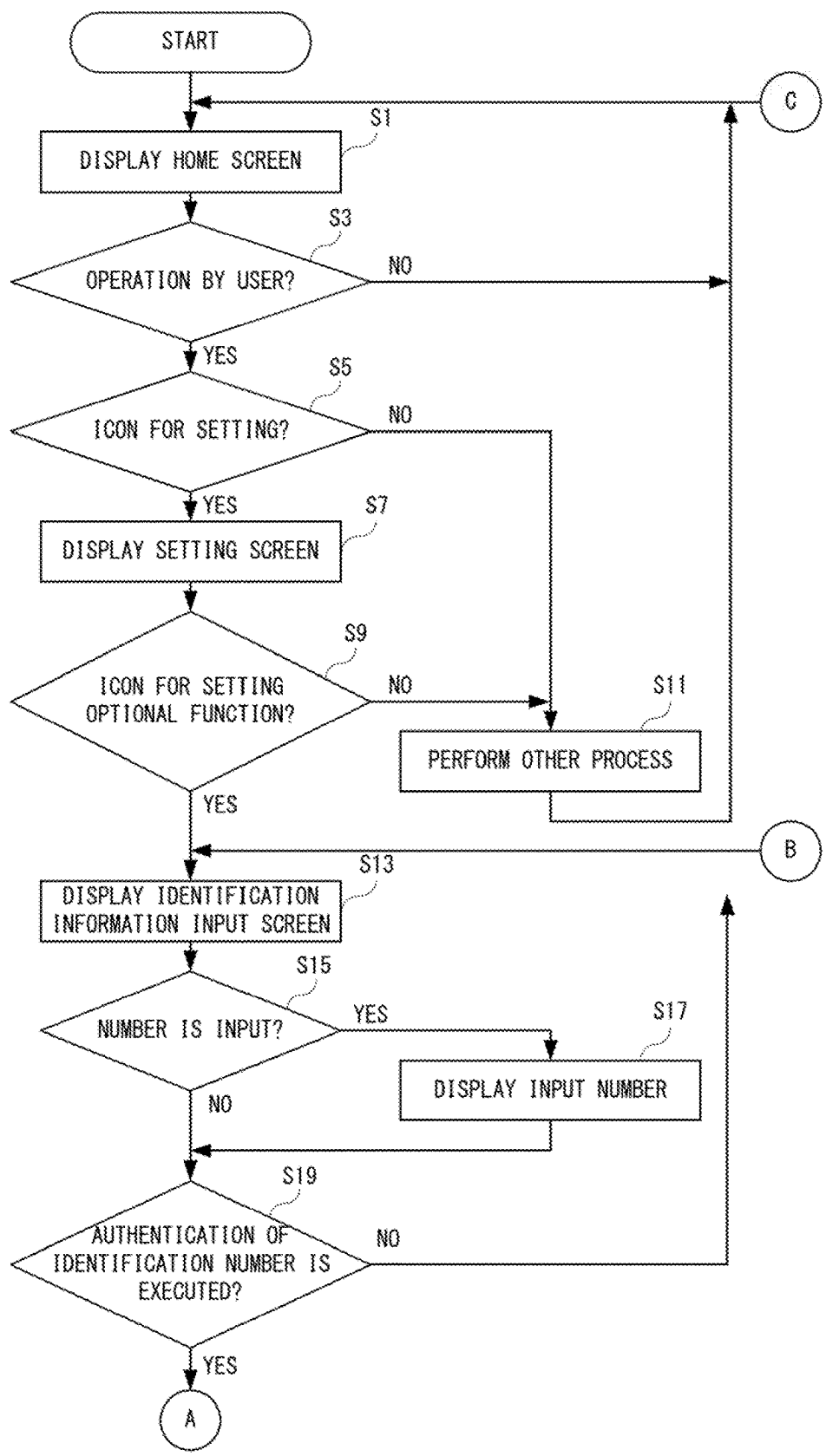
FIG. 13 is a flowchart illustrating an example of a control process of a central processing unit (CPU) of the image forming apparatus.
Figure 14:
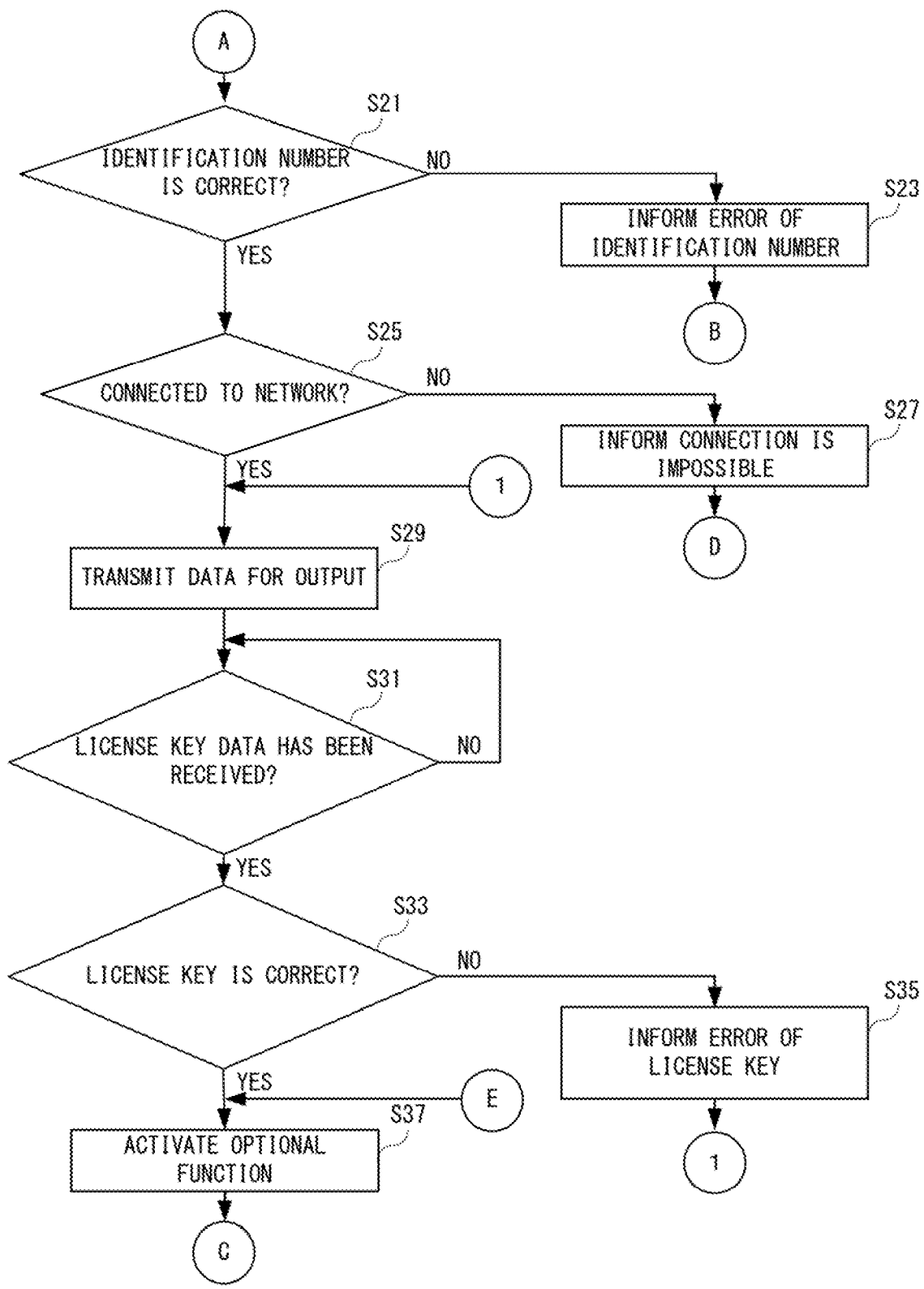
FIG. 14 is a flowchart illustrating another part of the control process of the CPU of the image forming apparatus, which is subsequent to FIG. 16.
Figure 15:
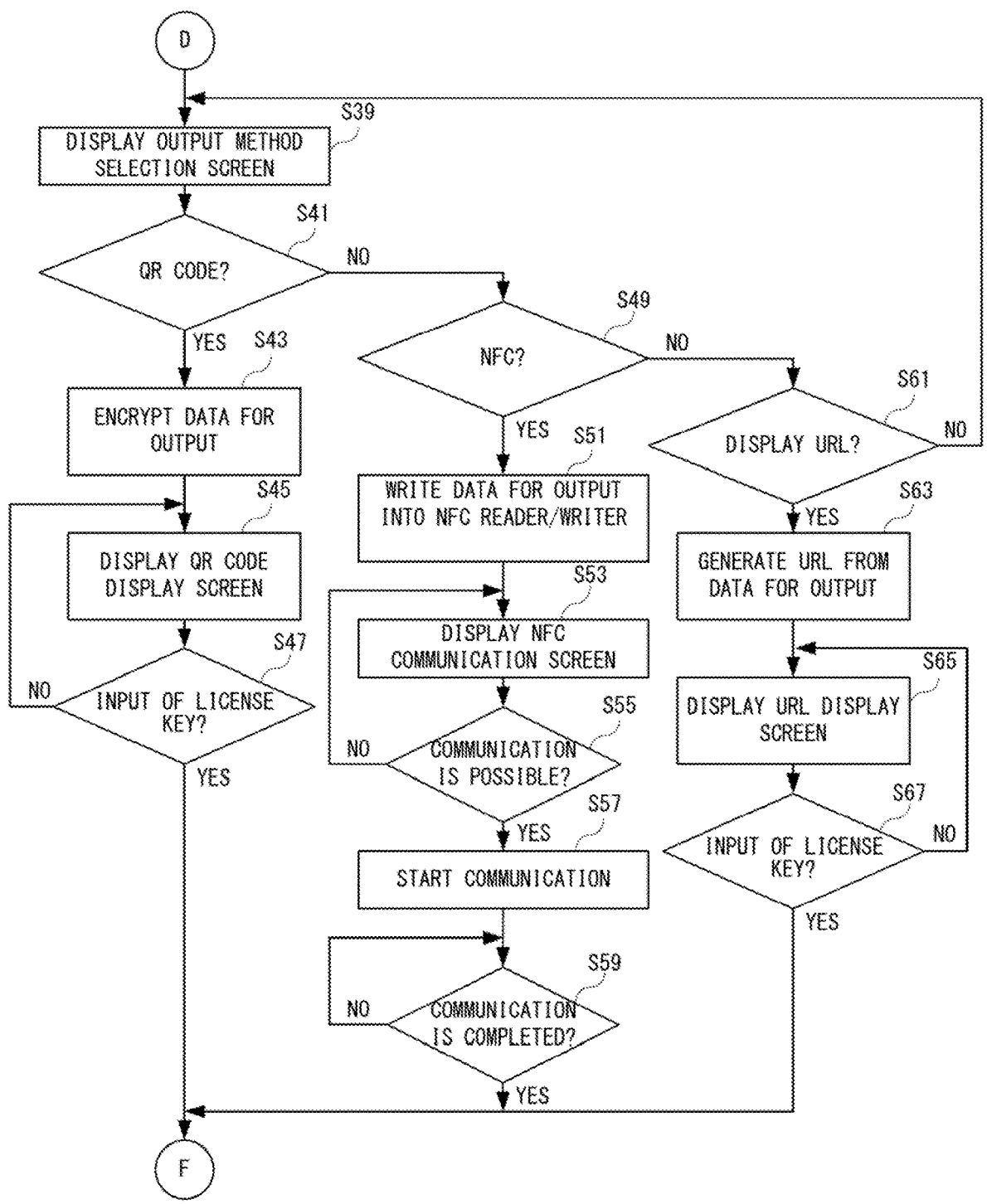
FIG. 15 is a flowchart illustrating another part of the control process of the CPU of the image forming apparatus, which is subsequent to FIG. 14.

FIGS. 13, 14, 15 and 16 are flowcharts illustrating a control process (or an information process) of the CPU 22 illustrated in FIG. 2. Hereinafter, a specific process of the CPU 22 will be described. However, as described above, the user authentication process is performed when a power of the image forming apparatus 12 is turned on or when the image forming apparatus 12 recovers from the power saving mode to the normal mode. That is, the user authentication process is performed before the control process illustrated in FIGS. 13 to 15 is started. In addition, in the control process illustrated in FIGS. 13 to 15, for the sake of simplicity, the process is omitted when returning to a previous screen.

As illustrated in FIG. 13, when the control process is started, the CPU 22 displays, the home screen 100 such as that illustrated in FIG. 4, on the display 32 of the image forming apparatus 12 in step S1. In the next step S3, it is determined whether the user has performed an operation. The process for detecting operation data is executed in parallel separately from the control process, and in the step S3, the CPU 22 determines whether the operation data 404a in a current frame is stored in the data storage area 404. However, the frame is a unit time for updating a screen, and is, for example, 1/30 seconds, 1/60 seconds, or 1/120 seconds.

If "NO" in the step S3, that is, if there is no operation by the user, the process returns to the step S3. Meanwhile, if "YES" in the step S3, that is, if there is an operation by the user, it is determined in step S5 whether the setting icon 104 provided in the home screen 100 is touched.

If "NO" in the step S5, that is, if another icon 102 is touched, another process is performed in step S11, and the process returns to the step S1. Although detailed description is omitted, in the step S11, a process for copying, faxing, or scanning, or a process for basic setting and paper setting is performed. Meanwhile, if "YES" in the step S5, that is, if the icon 104 is touched, the setting screen 120 such as that illustrated in FIG. 5 is displayed on the display 32 in step S7.

Subsequently, in step S9, it is determined whether the icon 122 for setting an optional function provided in the setting screen 120 is touched. If "NO" in the step S9, that is, if the icon 122 for basic setting or paper setting is touched, the process proceeds to the step S11. Meanwhile, if "YES" in the step 9, that is, if the icon 122 for setting an optional function is touched, the identification information input screen 140 is displayed on the display 32 in step S13, and it is determined whether a number is input in step S15.

If "NO" in the step S15, that is, if a number is not input, the process proceeds to step S19. Meanwhile, if "YES" in the step S15, that is, if a number is input, the input number is displayed in the input area 144 in step S17, and the process proceeds to the step S19.

In the step S19, it is determined whether the authentication of identification information is executed. Here, the CPU 22 determines whether the icon 152 has been touched in the identification information input screen 140. If "NO" in the step S19, that is, if the icon 152 is not touched, the process returns to the step S13. Meanwhile, if "YES" in the step S19, that is, if the icon 152 is touched, it is determined whether the identification information is correct in step S21 illustrated in FIG. 14. Here, the CPU 22 determines whether the input identification information matches the identification information stored in advance in the HDD 42.

If "NO" in the step S21, that is, if the identification information is not correct, an error of the identification information is informed in step S23, and the process returns to the step S13 illustrated in FIG. 13. Meanwhile, if "YES" in the step S21, that is, if the identification information is correct, it is determined in step S25 whether connected to the network 18.

If "NO" in the step S25, that is, if not connected to the network 18, information that the connection to the network 18 is impossible is informed in step S27, and the process proceeds to step S39 illustrated in FIG. 15.

Meanwhile, if "YES" in the step S25, that is, if the network 18 is connected, the data for output 404c is transmitted to the management server 16 in step S29.

Subsequently, in step S31, it is determined whether license key data has been received. If "NO" in the step S31, that is, if the license key data has not been received, the process returns to the step S31 and waits for reception of the license key data. Meanwhile, if "YES" in the step S31, that is, if the license key data has been received, it is determined in step S33 whether the license key is correct. Here, the CPU 22 determines whether the received license key matches the verification information.

If "NO" in the step S33, that is, if the license key is not correct, an error of the license key is informed in step S35, and the process returns to the step S29. Meanwhile, if "YES" in the step S33, that is, if the license key is correct, a corresponding optional function is activated in step S37, and the process returns to the step S1 illustrated in FIG. 13.

As illustrated in FIG. 15, in step S39, the output method selection screen 160 such as that illustrated in FIG. 7 is displayed on the display 32, and in step S41, it is determined whether the QR code is selected. That is, the CPU 22 determines whether the icon 162 has been touched in the output method selection screen 160.

If "NO" in the step S41, that is, if the QR code is not selected, the process proceeds to step S49. Meanwhile, if "YES" in the step S41, that is, if the QR code is selected, an encoding process is performed on the data for output 404c in step S43, and the QR code display screen 180 such as that illustrated in FIG. 8 is displayed on the display 32 in step S45.

In the next step S47, it is determined whether there is an input of a license key. Here, the CPU 22 determines whether the icon 182 has been touched in the QR code display screen 180. If "NO" in the step S47, that is, if the icon 182 is not touched, the process returns to the step S45. Meanwhile, if "YES" in the step S47, that is, if the icon 182 is touched, the process proceeds to step S69 illustrated in FIG. 16.

In addition, in the step S49, it is determined whether the NFC is selected. That is, the CPU 22 determines whether the icon 164 has been touched in the output method selection screen 160. If "NO" in the step S49, that is, if the icon 164 is not touched, the process proceeds to step S61. Meanwhile, if "YES" in the step S49, that is, if the icon 164 is touched, the data for output 404c is written to the NFC reader/writer 40 in step S51, and the NFC communication screen 200 such as that illustrated in FIG. 9 is displayed on the display 32 in step S53.

In the next step S55, it is determined whether the near field communication by the NFC reader/writer 40 is possible. If "NO" in the step S55, that is, if the NFC reader/writer 64 of the user terminal 14 is not in a near field communication range and a communication state of a wireless communication is not established, the process returns to the step S53. Meanwhile, if "YES" in the step S55, that is, if the NFC reader/writer 64 of the user terminal 14 is present in the near field communication range, the communication state of the wireless communication between the NFC reader/writer 40 and the NFC reader/writer 64 is established, and the near field communication is started in step S57.

Then, in step S59, it is determined whether the communication is completed. If "NO" in the step S59, that is, if the communication is not completed, the process returns to the step S59. Meanwhile, if "YES" in the step S59, that is, if the communication is completed, the process proceeds to the step S69.

In addition, in the step S61, it is determined whether the displaying URL is selected. Here, the CPU 22 determines whether the icon 166 has been touched in the output method selection screen 160. If "NO" in the step S61, that is, if the displaying URL is not selected, the process returns to the step S39. Meanwhile, if "YES" in the step S61, that is, if the displaying URL is selected, a URL is generated from the data for output 404c in step S63, and the URL display screen 220 such as that illustrated in FIG. 10 is displayed on the display 32 in step S65.

In the next step S67, it is determined whether there is an input of a license key. Here, the CPU 22 determines whether the icon 224 has been touched in the URL display screen 220. If "NO" in the step S67, that is, if the icon 224 is not touched, the process returns to the step S65. Meanwhile, if "YES" in the step S67, that is, if the icon 224 is touched, the process proceeds to the step S69.

Figure 16:
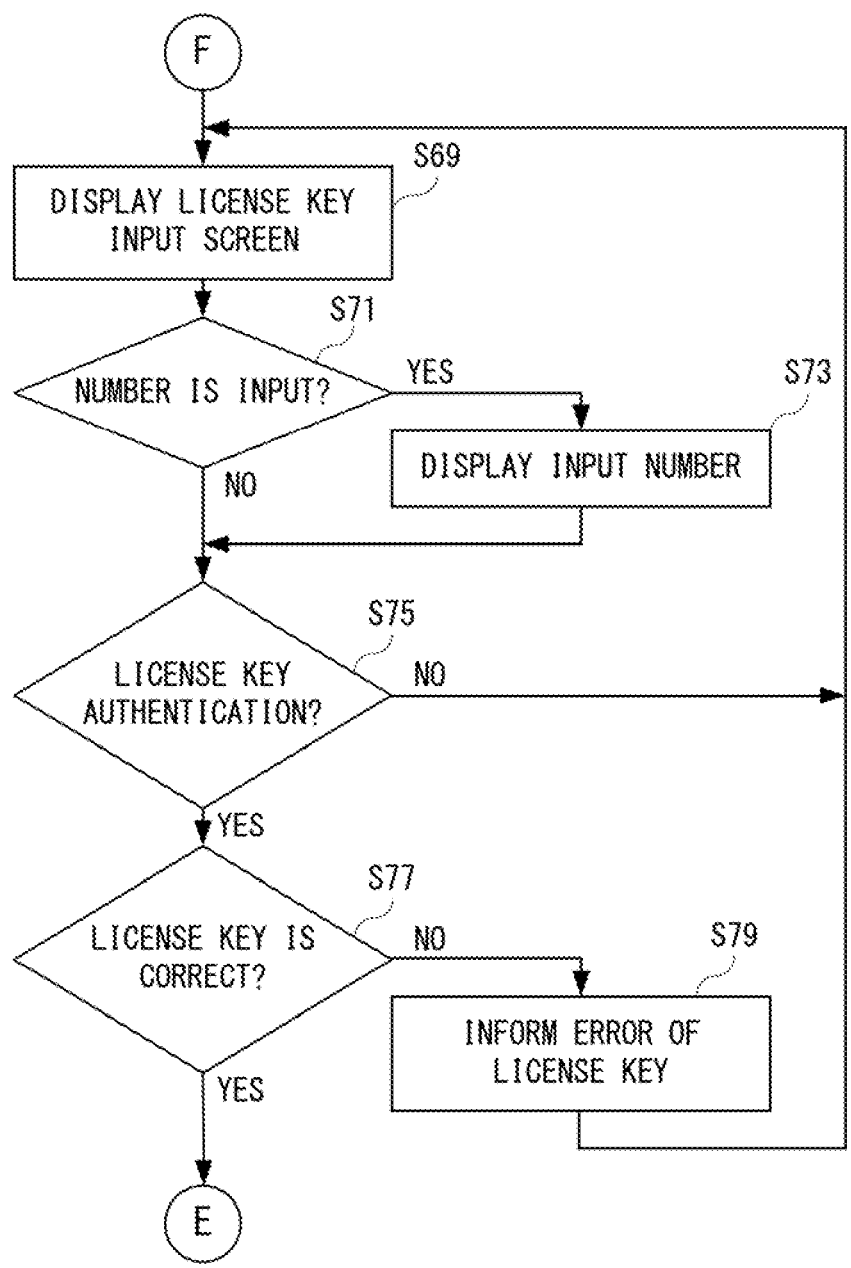
FIG. 16 is a flowchart illustrating a further other part of the control process of the CPU of the image forming apparatus, which is subsequent to FIG. 15.

As illustrated in FIG. 16, in step S69, the license key input screen 240 such as that illustrated in FIG. 11 is displayed on the display 32. In the next step S71, it is determined whether a number is input. Here, the CPU 22 determines whether the numeric keys 242 have been touched. If "NO" in the step S71, that is, if a number is not input, the process proceeds to step S75. Meanwhile, if "YES" in the step 71, that is, if a number is input, the input number is displayed in the input area 248 in step S73, and the process proceeds to the step S75.

In the step S75, it is determined whether a license key authentication process is executed. Here, the CPU 22 determines whether the icon 244 has been touched in the license key input screen 240. If "NO" in the step S75, that is, if the license key authentication process is not executed, the process returns to the step S69. Meanwhile, if "YES" in the step S75, that is, if the license key authentication process is executed, it is determined in step S77 whether the license key is correct. Here, the CPU 22 determines whether the input license key matches the verification information.

If "NO" in the step S77, that is, if the license key is not correct, an error of the license key is informed in step S79, and the process returns to the step S69. Meanwhile, if "YES" in the step S77, that is, if the license key is correct, the process proceeds to the step S37 illustrated in FIG. 14.

According to this first embodiment, even when the image forming apparatus 12 is unable to connect to the network 18, the license key can be acquired from the management server 16 with the use of the user terminal 14, and thus an optional function can be easily activated.

While, in this first embodiment, the user authentication is performed before the home screen 100 is displayed, the timing of the user authentication needs not be limited. In another example, the user authentication may be performed at a timing when it is instructed to perform a setting (or confirmation) process of the optional function.

In addition, while a case where one optional function is activated at a time has been described in this first embodiment, a plurality of optional functions can be activated at a time. In such a case, a user inputs identification information of a plurality of optional functions, and in response to a touch on the icon 152, the data for output 404c including the input identification information of the plurality of optional functions is transmitted to the management server 16, and the license key data of each of the plurality of optional functions is returned from the management server 16. Then, it is determined whether each license key matches the verification information.

Moreover, in this first embodiment, as illustrated in steps S13 to S21 of FIGS. 6 and 13, the user directly inputs the identification information of an optional function. However, the identification information may be listed together with the name of the optional function to be added and/or the description of the optional function and may be selected by the user. In addition, when the identification information is listed together with the name of the optional function to be added and/or the description of the optional function, information indicating whether the optional function is activated and information such as an expiration date of a license of the activated optional function may also be added.

Furthermore, while in this first embodiment, the license key data is acquired from the management server 16 and input to the image forming apparatus 12, the present invention is not required to be limited to this. The license key data may activate a corresponding optional function only in the image forming apparatus 12 which has output the data for output 404c. For example, the license key data is converted into information that can activate an optional function only in the image forming apparatus 12 that has output the data for output 404c. For example, the management server 16 acquires, from the accessed user terminal 14, a serial number assigned to the image forming apparatus 12 that has output the data for output 404c, and encodes the license key data with the use of the acquired serial number. When the encoded license key data is input, the image forming apparatus 12 decodes same with the use of its own serial number, and authenticates the decoded license key data. In this way, an optional function can be activated only in the image forming apparatus 12 selected to activate the optional function. Therefore, it is possible to prevent the optional function from being activated improperly in another image forming apparatus of the same type.

In addition, while in this first embodiment, the image forming apparatus 12 is provided with the NFC reader/writer 40, the image forming apparatus 12 only needs to communicate with the NFC reader/writer 64 provided in the user terminal 14, and thus the NFC reader/writer 40 may not be provided with the reader/writer function.

Furthermore, while in this first embodiment, a case where the image forming apparatus 12 having a communication function is disposed in an environment where a connection to the network 18 is impossible has been described, the same applies to a case of an image forming apparatus 12 not having the communication function.

Second Embodiment

A second embodiment is the same as the first embodiment except that the authentication method of the license key data is determined in accordance with the method for acquiring the data for output 404c selected by the user, and therefore redundant description will be omitted.

In the second embodiment, when the icon 162 is touched in the output method selection screen 160 and the first method is selected, the image forming apparatus 12 reads a QR code obtained by encoding a license key from the user terminal 14, and decodes the read QR code into the license key to determine whether the license key is correct.

Figure 17:
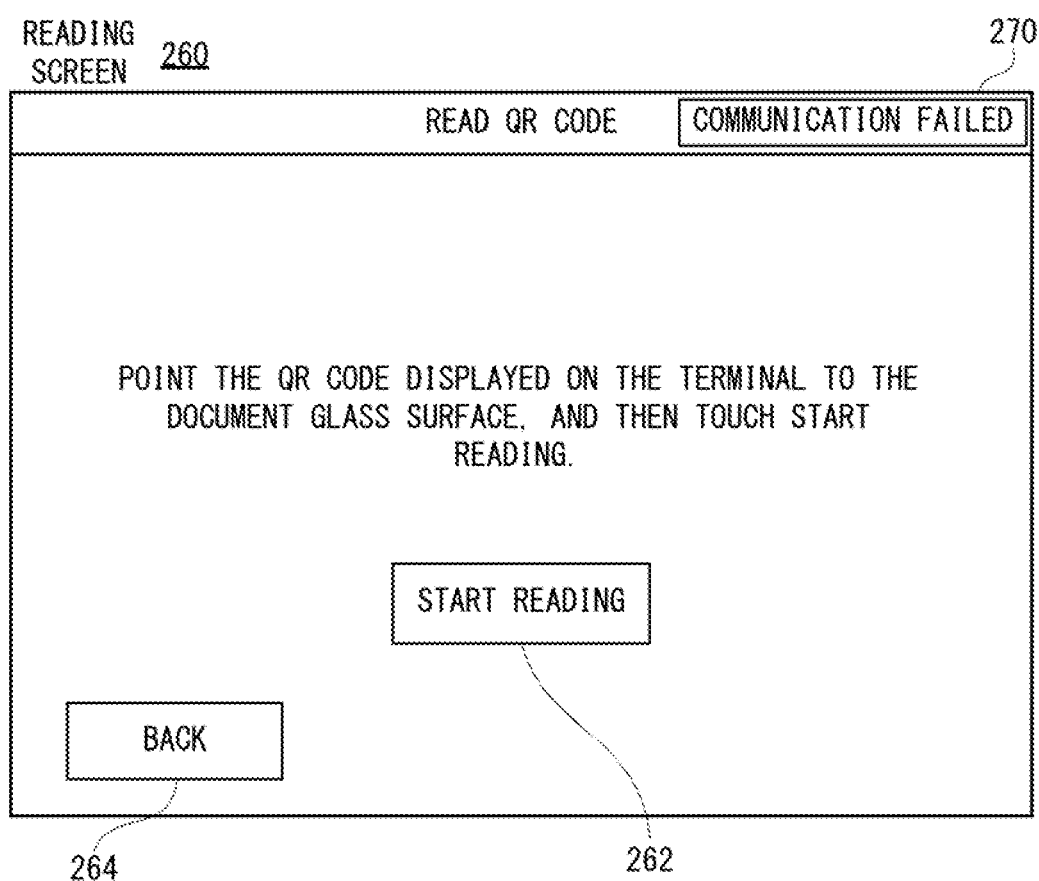
FIG. 17 is a diagram illustrating an example of a reading screen displayed on a display of an image forming apparatus of a second embodiment.

Therefore, in the second embodiment, when the icon 182 is touched in the QR code display screen 180, a reading screen 260 such as that illustrated in FIG. 17 is displayed on the display 32. The reading screen 260 is provided with an icon 262 and an icon 264. In addition, in the reading screen 260, a message prompting placement of the user terminal 14 with a QR code displayed on the user terminal 14 facing a document table and execution of start reading and an index image 270 are displayed.

The icon 262 is provided to start reading the QR code at an arbitrary timing, and is touched to drive the image reader 36, and the QR code displayed on the user terminal 14 is scanned.

The user operates the user terminal 14 to display, on the display 68, the QR code obtained by encoding the license key data received from the management server 16.

The image forming apparatus 12 decodes the scanned QR code, determines whether the decoded license key matches the verification information stored in the HDD 42. If it matches, an optional function is activated, and if it does not match, an error of the license key is displayed.

In addition, when the icon 164 is touched in the output method selection screen 160 and the second method is selected, the image forming apparatus 12 receives license key data from the NFC reader/writer 64 of the user terminal 14 by near field communication, and determines whether the license key is correct.

Therefore, in the second embodiment, when the NFC communication screen 200 is displayed on the display 32 and the image forming apparatus 12 completes the transmission of the data for output 404c by near field communication, a reception process of the license key data by near field communication is started. In this second embodiment, the NFC communication screen 200 is continuously displayed on the display 32, and a state where the NFC reader/writer 40 is also continuously activated is maintained.

The user operates the user terminal 14 to write (output) the license key data received from the management server 16 into the NFC reader/writer 64. Moreover, the user brings the user terminal 14 close to the NFC reader/writer 40 of the image forming apparatus 12 and transmits the license key data by near field communication.

The image forming apparatus 12 determines whether a license key corresponding to the received license key data matches the verification information stored in the HDD 42. If it matches, an optional function is activated, and if it does not match, an error of the license key is displayed.

However, when the icon 166 is touched in the output method selection screen 160 and the third method is selected, the image forming apparatus 12 displays the license key input screen 240 on the display 32, as is the case with the first embodiment, and determines whether a license key manually input by the user matches the verification information, and if it matches, an optional function is activated, and if it does not match, an error of the license key is displayed. The method for the user to manually input the license key has been described in the first embodiment, and thus redundant description will be omitted.

Figure 18:
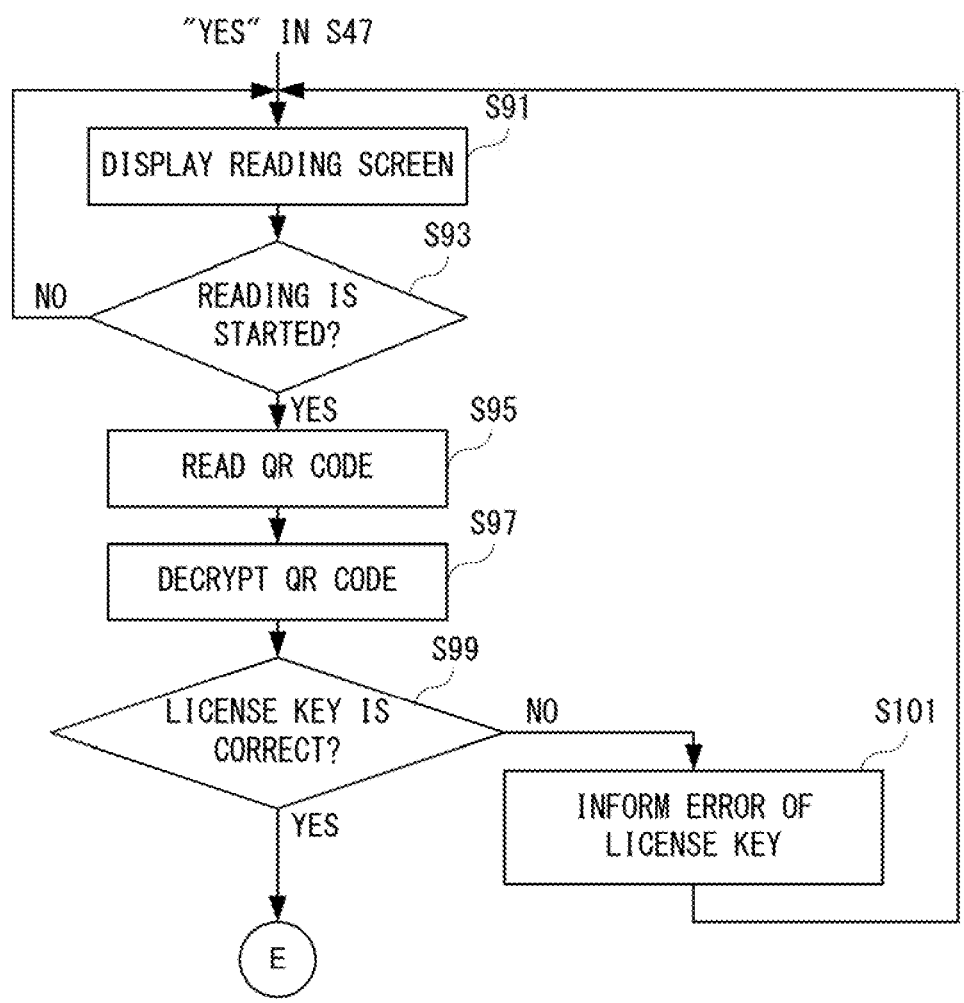
FIG. 18 is a flowchart illustrating an example of a control process of a CPU of the image forming apparatus of the second embodiment.
Figure 19:
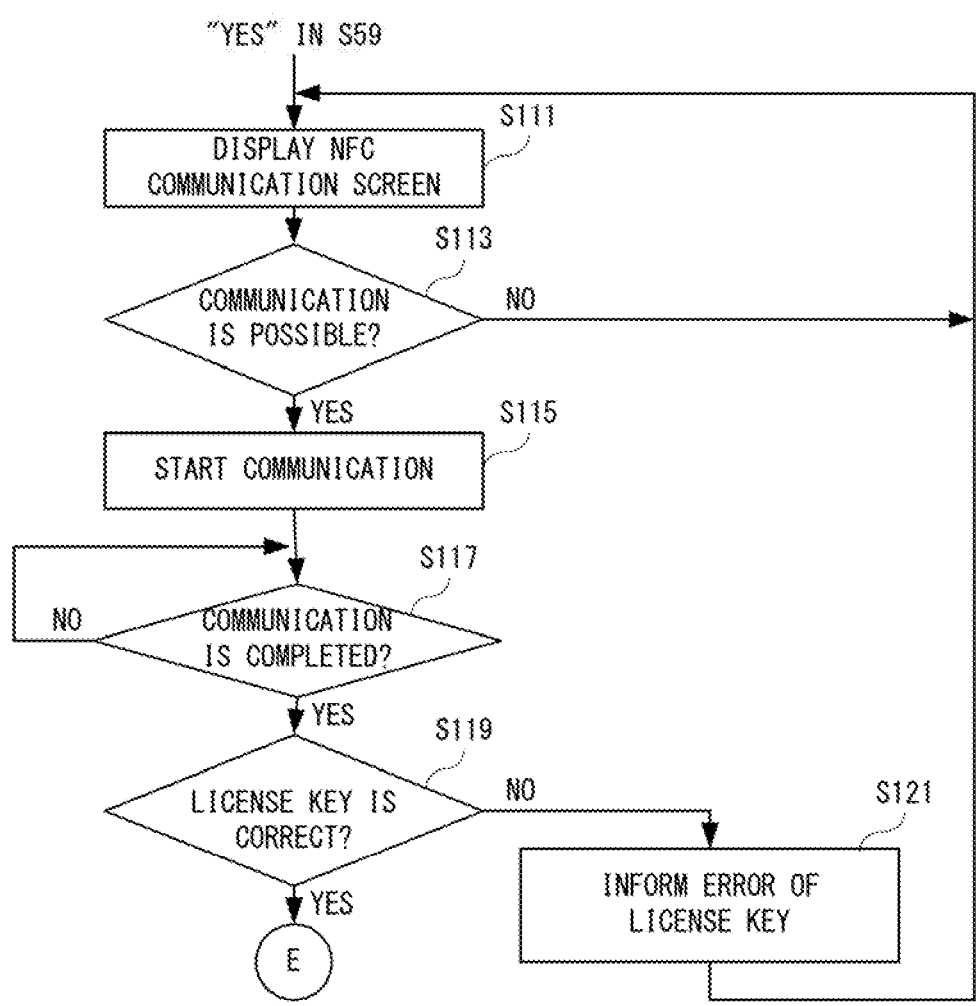
FIG. 19 is a flowchart illustrating another part of an example of the control process of the CPU of the image forming apparatus of the second embodiment.

FIGS. 18 and 19 are flowcharts illustrating a part of a control process of the second embodiment. As described above, in the second embodiment, when the QR code or the displaying URL is selected as the acquisition method, the license key is input by a method different from the first embodiment. That is, except for the process of step S47 and subsequent processes and the process of step S59 and subsequent processes in FIG. 15, the flow is the same as that of the control process illustrated in FIGS. 13 to 16 illustrated in the first embodiment. Thus, only different contents will be described.

If "YES" in the step S47, the reading screen 260 such as that illustrated in FIG. 17 is displayed on the display 32 in step S91 as illustrated in FIG. 18. In the following step S93, it is determined whether reading is started. Here, the CPU 22 determines whether the icon 262 provided in the reading screen 260 has been touched.

If "NO" in the step S93, that is, if the reading is not started, the process returns to the step S91. Meanwhile, if "YES" in the step S93, that is, if the reading is started, the image reader 36 is driven to read a QR code in step S95. Furthermore, in step S97, the QR code read in step S95 is decoded.

Then, in step S99, it is determined whether the decoded license key is correct. If "NO" in the step S99, that is, if the license key is not correct, an error of the license key is informed in step S101, and the process returns to the step S91. Meanwhile, if "YES" in the step S99, that is, if the license key is correct, the process proceeds to the step S37 illustrated in FIG. 14.

If "YES" in the step S59, the NFC communication screen 200 is continuously displayed on the display 32 in step S111 as illustrated in FIG. 19. In the next step S113, it is determined whether the near field communication by the NFC reader/writer 40 is possible. If "NO" in the step S113, that is, if the NFC reader/writer 64 provided in the user terminal 14 is not in a near field communication range and a communication state is not established, the process returns to the step S111. Meanwhile, if "YES" in the step S113, that is, if the NFC reader/writer 64 is present in the near field communication range and a communication state between the NFC reader/writer 40 and the NFC reader/writer 64 is established, the near field communication is started in step S115.

In the next step S117, it is determined whether the communication is completed. Here, the CPU 22 determines whether license key data has been received. If "NO" in the step S117, that is, if the communication is not completed, the process returns to the step S117. Meanwhile, if "YES" in the step 117, that is, if the communication is completed, it is determined in step S119 whether the license key is correct.

If "NO" in the step S119, that is, if the license key is not correct, an error of the license key is informed in step S121, and the process returns to the step S111. Meanwhile, if "YES" in the step S119, that is, if the license key is correct, the process proceeds to the step S37 illustrated in FIG. 14.

Also, in the second embodiment, as is the case with the first embodiment, even when the image forming apparatus 12 is not connected to the network 18, an optional function can be easily activated.

Third Embodiment

A third embodiment is the same as the second embodiment except that the method for inputting a license key is made selectable, and therefore redundant description will be omitted.

Figure 20:
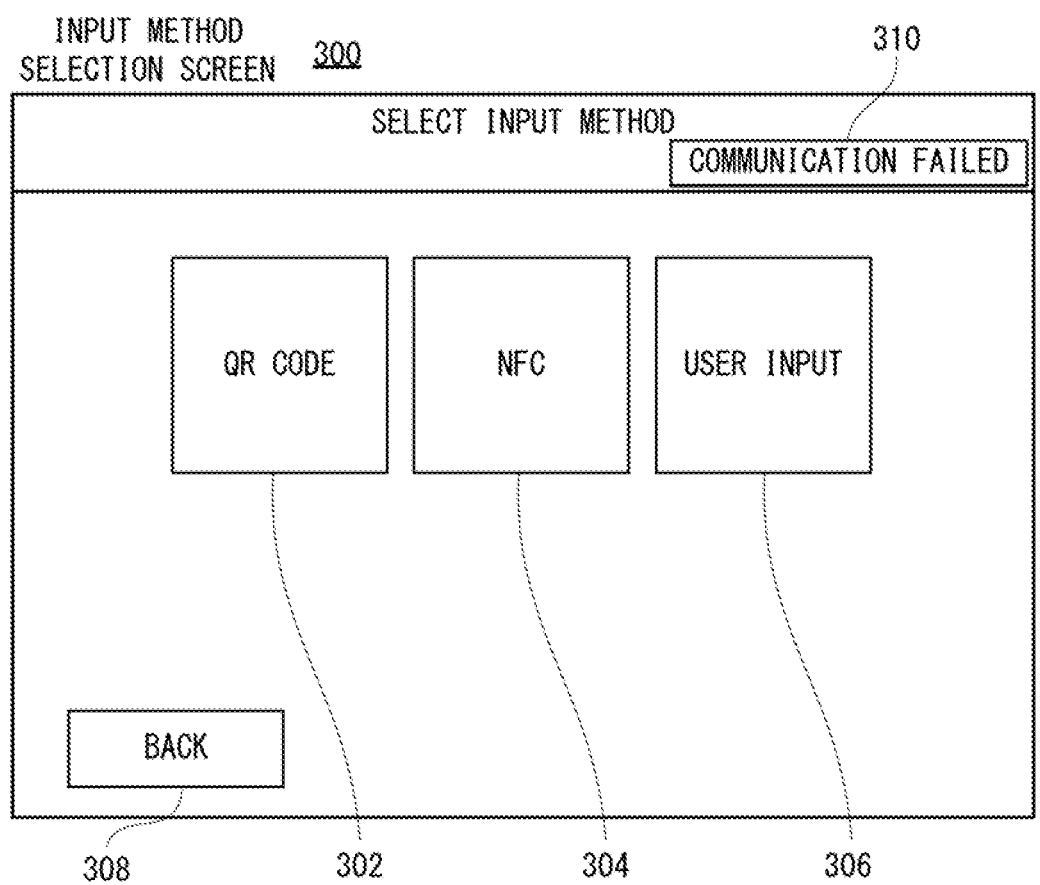
FIG. 20 is a diagram illustrating an example of an input method selection screen displayed on a display of an image forming apparatus of a third embodiment.

In the third embodiment, when the icon 182 is touched in the QR code display screen 180 illustrated in FIG. 8, or when communication is completed when the NFC communication screen 200 illustrated in FIG. 9 is displayed, or when the icon 224 is touched in the URL display screen 220 illustrated in FIG. 10, an input method selection screen 300 such as that illustrated in FIG. 20 is displayed on the display 32.

The input method selection screen 300 is a screen for selecting a license key input method, and is provided with an icon 302, an icon 304, an icon 306, and an icon 308. In addition, in the input method selection screen 300, an index image 310 is displayed.

The icon 302, icon 304 and icon 306 are provided to select a license key input method. When the icon 302 is touched, a method for inputting a license key by QR code is selected. When the icon 304 is touched, a method for inputting a license key by near field communication is selected. Since these input methods have been described in the second embodiment, redundant description will be omitted. In addition, when the icon 306 is touched, a method for a user to manually input a license key is selected. The method for the user to manually input the license key has been described in the first embodiment, and thus redundant description will be omitted.

Figure 21:
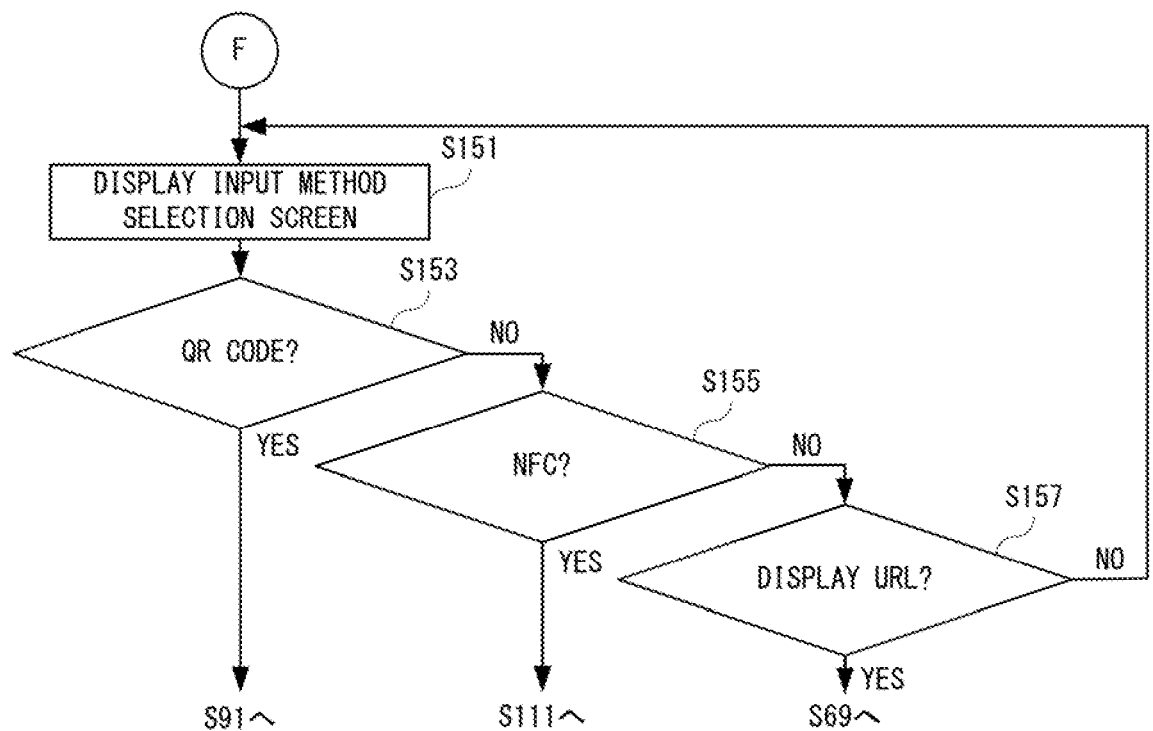
FIG. 21 is a flowchart illustrating an example of a control process of a CPU of the image forming apparatus of the third embodiment.

FIG. 21 is a flowchart illustrating a part of a control process of the third embodiment of the CPU 22 illustrated in FIG. 2. The control process of the third embodiment is the same as that of the second embodiment except that a part of the control process is changed, and thus different content will be described.

In the control process of the third embodiment, if "YES" in the step S47, "YES" in step the S59, or "YES" in the step S67 as illustrated in FIG. 21, the input method selection screen 300 such as that illustrated in FIG. 20 is displayed on the display 32 in step S151.

In the next step S153, it is determined whether the QR code is selected. Here, the CPU 22 determines whether the icon 302 has been touched in the input method selection screen 300. If "YES" in the step S153, the process proceeds to the step S91 illustrated in FIG. 18. Meanwhile, if "NO" in the step S153, that is, if the QR code is not selected, it is determined whether the NFC is selected in step S155. Here, the CPU 22 determines whether the icon 304 has been touched in the input method selection screen 300.

If "YES" in the step S155, that is, if the NFC is selected, the process proceeds to the step S111 illustrated in FIG. 19. Meanwhile, if "NO" in the step S155, it is determined in step S157 whether the displaying URL is selected. Here, the CPU 22 determines whether the icon 306 has been touched in the input method selection screen 300.

If "YES" in the step S157, that is, if the displaying URL is selected, the process proceeds to the step S69 illustrated in FIG. 16. Meanwhile, if "NO" in the step S157, that is, if the displaying URL is not selected, the process returns to the step S151.

Also, in the third embodiment, as is the case with the first embodiment and the second embodiment, even when the image forming apparatus 12 is not connected to the network 18, an optional function can be easily activated.

The specific numerical values and screens illustrated in each of the above-described embodiments are merely examples, and can be appropriately changed in an actual product.

In addition, the flowcharts illustrated in each of the above-described embodiments are merely examples, and the order of each step can be arbitrarily changed if the same effect can be obtained.

What is claimed is:
1. An image forming apparatus comprising:
a memory that stores instructions; and
a processor that executes the instructions stored in the memory to:
set an optional function;
determine whether the image forming apparatus can be connected to an external network when the optional function is set;

output acquisition information for acquiring activation information for activating the optional function from a server when it is determined that a connection is not possible;
input the activation information; and
activate the optional function in response to an input of the activation information, wherein
the activation information is inputted to the image forming apparatus via a mobile terminal that acquires the activation information from the server.

2. The image forming apparatus according to claim 1, wherein a method for outputting the acquisition information is selected,
and the acquisition information is outputted by the method selected.

3. The image forming apparatus according to claim 2, wherein the activation information is inputted by a same method as the method selected.

4. The image forming apparatus according to claim 2, wherein encoded information obtained by encoding the acquisition information is inputted.

5. The image forming apparatus according to claim 2, wherein the acquisition information is outputted by near field communication.

6. The image forming apparatus according to claim 2, wherein data of a URL corresponding to the acquisition information to a displayer is outputted.

7. The image forming apparatus according to claim 2,
wherein the acquisition information is outputted to the mobile terminal provided being connectable to the server via the network.

8. The image forming apparatus according to claim 2, wherein the acquisition information includes information indicating a connection destination of the server, information for identifying the optional function, and information for specifying the image forming apparatus.

9. The image forming apparatus according to claim 2, wherein the activation information is information to activate the optional function only in the image forming apparatus that has output the acquisition information.

10. The image forming apparatus according to claim 1, wherein encoded information obtained by encoding the acquisition information is outputted.

11. The image forming apparatus according to claim 1, wherein the acquisition information is outputted by near field communication.

12. The image forming apparatus according to claim 1, wherein data of a URL corresponding to the acquisition information to a displayer is outputted.

13. The image forming apparatus according to claim 1, wherein the acquisition information includes information indicating a connection destination of the server, information for identifying the optional function, and information for specifying the image forming apparatus.

14. The image forming apparatus according to claim 1, wherein the activation information is information to activate the optional function only in the image forming apparatus that has output the acquisition information.

15. The image forming apparatus according to claim 1, wherein the acquisition information is outputted to the mobile terminal provided being connectable to the server via the network.

16. An information processing system comprising an image forming apparatus and mobile terminal provided being connectable to a server via a network, the image forming apparatus comprising:
a memory that stores instructions; and
a processor that executes the instructions stored in the memory to:
set an optional function;
determine whether the image forming apparatus can be connected to the network when the optional function is set;
output acquisition information for acquiring activation information for activating the optional function from the server when it is determined that a connection is not possible;
input the activation information; and
activate the optional function in response to an input of the activation information by the input means,
and the mobile terminal comprising:
a memory that stores instructions; and
a processor that executes the instructions stored in the memory to receive the activation information transmitted from the server in accordance with the acquisition information, wherein
the activation information is inputted to the image forming apparatus via the mobile terminal that acquires the activation information from the server.

17. An information processing method of an information processing system comprising an image forming apparatus and a mobile terminal provided being connectable to a server via a network, the information processing method comprising:
(a) setting an optional function of the image forming apparatus;
(b) determining whether the image forming apparatus can be connected to the network when setting the optional function in the (a);
(c) outputting, from the image forming apparatus, acquisition information for acquiring activation information for activating the optional function from the server when it is determined in the (b) that a connection is not possible;
(d) receiving, in the mobile terminal, the activation information transmitted from the server in accordance with the acquisition information;
(e) inputting the activation information to the image forming apparatus; and
(f) activating the optional function in response to an input of the activation information in the (e), wherein
the activation information is inputted to the image forming apparatus via the mobile terminal that acquires the activation information from the server.

* * * * *